United States Patent
Yu et al.

(10) Patent No.: US 12,294,891 B2
(45) Date of Patent: May 6, 2025

(54) COMMUNICATION METHOD AND APPARATUS

(71) Applicant: HUAWEI TECHNOLOGIES CO., LTD., Guangdong (CN)

(72) Inventors: Haifeng Yu, Beijing (CN); Feng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 415 days.

(21) Appl. No.: 17/836,719

(22) Filed: Jun. 9, 2022

(65) Prior Publication Data

US 2022/0322140 A1 Oct. 6, 2022

Related U.S. Application Data

(63) Continuation of application No. PCT/CN2019/124419, filed on Dec. 10, 2019.

(51) Int. Cl.
*H04W 28/06* (2009.01)
*H04W 84/20* (2009.01)

(52) U.S. Cl.
CPC ........... *H04W 28/06* (2013.01); *H04W 84/20* (2013.01)

(58) Field of Classification Search
CPC ..... H04L 9/0866; H04L 45/247; H04L 45/28; H04L 47/34; H04L 12/42; H04W 36/302; H04W 28/06; H04W 84/20; H04W 24/04
See application file for complete search history.

(56) References Cited

U.S. PATENT DOCUMENTS

| | | | |
|---|---|---|---|
| 2010/0027453 A1 | 2/2010 | Logalbo et al. | |
| 2018/0317275 A1* | 11/2018 | Chang | H04W 36/302 |
| 2021/0111874 A1* | 4/2021 | Tanji | H04L 9/0866 |

FOREIGN PATENT DOCUMENTS

| | | |
|---|---|---|
| CN | 108023800 A | 5/2018 |
| CN | 109996306 A | 7/2019 |
| EP | 2544472 A1 | 1/2013 |
| JP | 2016201654 A | 12/2016 |
| WO | 2013064867 A1 | 5/2013 |
| WO | 2019104685 A1 | 6/2019 |

OTHER PUBLICATIONS

3GPP TS 38.331 V15.7.0 (Sep. 2019), "3rd Generation Partnership Project; Technical Specification Group Radio Access Network; NR; Radio Resource Control (RRC) protocol specification (Release 15)," Sep. 2019, 527 pages.

(Continued)

*Primary Examiner* — Vinncelas Louis
(74) *Attorney, Agent, or Firm* — Fish & Richardson P.C.

(57) ABSTRACT

The disclosure provides communication methods and apparatuses. One example method includes that the first access network device obtains a correspondence between the first terminal apparatus and the second terminal apparatus. After obtaining a data packet, the first access network device sends a same data packet to the first terminal apparatus and the second terminal apparatus based on the correspondence, so that the first terminal apparatus and the second terminal apparatus transmit the same data packet to the slave station device.

20 Claims, 17 Drawing Sheets

(56) References Cited

OTHER PUBLICATIONS

Ericsson, "Anchor change for Ethernet PDU Sessions," 3GPP TSG-SA WG2 Meeting #128bis, S2-187767, Sophia Antipolis, France, Aug. 20-24, 2018, 12 pages.
Ericsson, "Ethernet Header Compression," 3GPP TSG-RAN WG2 #104, R2-1817175, Spokane, USA, Nov. 12-16, 2018, 8 pages.
Ericsson, "Redundant user plane paths based on dual connectivity," 3GPP TSG-SA WG2 Meeting #127bis, S2-184862, Newport Beach, USA, May 28-Jun. 1, 2018, 5 pages.
Huawei, HiSilicon, "CR on 37.340 for supporting the handover from NR to EN-DC," 3GPP TSG-RAN WG2 Meeting#104, R2-1817363, Spokane, USA, Nov. 12-16, 2018, 4 pages.
PCT International Search Report and Written Opinion issued in International Application No. PCT/CN2019/124419 on Sep. 15, 2020, 16 pages (with English translation).
Castello et al., "A Distributed PMU for Electrical Substations With Wireless Redundant Process Bus," IEEE Transactions on Instrumentation and Measurement, vol. 64, No. 5, May 2015, 9 pages.
Kleineberg et al., "Redundancy Enhancements for Industrial Ethernet Ring Protocols," 2010 IEEE 15th Conference on Emerging Technologies & Factory Automation (ETFA 2010), Sep. 13-16, 2010, 8 pages.
Partial Supplementary European Search Report in European Appln No. 19955653.1, dated Oct. 28, 2022, 15 pages.

\* cited by examiner

COMMUNICATION METHOD AND APPARATUS

CROSS-REFERENCE TO RELATED APPLICATIONS

This application is a continuation of International Application No. PCT/CN2019/124419, filed on Dec. 10, 2019, the disclosure of which is hereby incorporated by reference in its entirety.

TECHNICAL FIELD

This application relates to the field of communication technologies, and in particular, to a communication method and apparatus.

BACKGROUND

An industrial Ethernet is an Ethernet applied to industrial configuration. Usually, a wired connection is used for industrial Ethernet communication. However, when the industrial Ethernet is connected to a wireless communication network, a redundancy transmission mechanism supported by an existing wireless communication network cannot satisfy requirements of a redundancy transmission mechanism of the industrial Ethernet, affecting transmission reliability of Ethernet data.

SUMMARY

Embodiments of this application provide a communication method and apparatus, to improve data transmission reliability.

To achieve the foregoing objective, the following technical solutions are used in embodiments of this application.

According to a first aspect, an embodiment of this application provides a communication method. The method includes: An access network device obtains a correspondence between a first terminal apparatus and a second terminal apparatus. After obtaining a data packet, the access network device sends the data packet to the first terminal apparatus and the second terminal apparatus based on the correspondence.

In this way, the access network device sends the same data packet to the two terminal apparatuses based on the correspondence between the two terminal apparatuses. When a ring network topology structure is constituted by the access network device and a slave station device together with the two terminal apparatuses, the data packet sent by the access network device to the first terminal apparatus is transmitted to the second terminal apparatus via the slave station device, and finally returned to the access network device. The data packet sent by the access network device to the second terminal apparatus is transmitted to the first terminal apparatus via the slave station device, and finally returned to the access network device. When the data packet passes through each slave station device, the slave station device may read data sent by a master station device to the slave station device, and write data to be sent to the master station device into the data packet. Because data packets sent by the access network device to the two terminal apparatuses are the same, and the same data packets are processed by a same slave station device, the data packets finally returned by the two terminal apparatuses to the access network device are the same. In this way, data redundancy transmission is implemented, and data transmission reliability is improved.

In a possible design, the communication method provided in this embodiment of this application further includes: The access network device receives first data from the first terminal apparatus. The access network device sends transmission indication information to the second terminal apparatus, where the transmission indication information indicates the second terminal apparatus to stop transmitting second data to the access network device. The first data is data obtained by transmitting the data packet along a first path, and the second data is data obtained by transmitting the data packet along a second path. The first path is from the second terminal apparatus to the first terminal apparatus via at least one slave station device, and the second path is from the first terminal apparatus to the second terminal apparatus via the at least one slave station device.

Data obtained by transmitting the data packet along the first path is the same as data obtained by transmitting the same data packet along the second path. Therefore, when the access network device receives the data packet returned by the first terminal apparatus, the access network device does not need to receive the data packet returned by the second terminal apparatus. In this way, the access network device sends the transmission indication information to the second terminal apparatus, to indicate the second terminal apparatus not to transmit the second data to the access network device. This saves air interface resources.

In a possible design, the transmission indication information is carried in a medium access control (MAC) sub protocol data unit (subPDU), the MAC subPDU includes a MAC subheader and a MAC control element (CE), and the MAC subheader includes a logical channel identifier (LCID).

The transmission indication information includes the LCID having a preset value, and the LCID having the preset value is for indicating the second terminal apparatus to stop transmitting the second data to the access network device; or the LCID having a preset value is for indicating that a MAC CE corresponding to the MAC subheader includes the transmission indication information. In this way, the MAC subheader and the MAC CE are different parts in the MAC subPDU, and both the different parts in the MAC subPDU can indicate the second terminal apparatus to stop transmitting the second data to the access network device.

In a possible design, a length of the MAC CE is a preset length, and the MAC CE is for indicating the second terminal apparatus to stop transmitting the second data to the access network device;

the MAC CE includes an identifier of a preset logical channel, and the MAC CE is for indicating the second terminal apparatus to stop transmitting, to the access network device, second data corresponding to the preset logical channel; the MAC CE includes a sequence number of a data packet, and the MAC CE is for indicating the second terminal apparatus to stop transmitting, to the access network device, second data corresponding to the sequence number; or the MAC CE includes an identifier of a data radio bearer, and the MAC CE is for indicating the second terminal apparatus to stop transmitting, to the access network device, second data corresponding to the data radio bearer. In other words, different types of MAC CEs carry the transmission indication information in different manners. Precision of indicating the second data by using different types of MAC CEs is different. Granularities of the second data indicated by using four types of MAC CEs include the second data corresponding to the second terminal apparatus, the second data corresponding to the preset logical channel, the second data corresponding to the sequence number, and the second data corresponding to the data radio bearer. Indication granularities vary with indication precision.

In a possible design, the preset length is 0.

In a possible design, that an access network device obtains a correspondence between a first terminal apparatus and a second terminal apparatus includes: The access network device obtains the correspondence between the first terminal apparatus and the second terminal apparatus from the first terminal apparatus, the second terminal apparatus, or a core network device. In this way, when the first terminal apparatus, the second terminal apparatus, or the core network device obtains the correspondence between the two terminal apparatuses, the access network device can obtain the correspondence between the two terminal apparatuses from the first terminal apparatus, the second terminal apparatus, or the core network device.

In a possible design, that an access network device obtains a correspondence between a first terminal apparatus and a second terminal apparatus includes: The access network device receives first redundancy identification information from the first terminal apparatus. The access network device receives second redundancy identification information from the second terminal apparatus. The access network device determines the correspondence between the first terminal apparatus and the second terminal apparatus based on the first redundancy identification information and the second redundancy identification information. In this way, after the access network device receives the redundancy identification information from the two terminal apparatuses, the access network device determines the correspondence between the two terminal apparatuses based on the redundancy identification information from the two terminal apparatuses.

In a possible design, the first redundancy identification information includes at least one of the following information: an identifier of a master station device, an identifier of the at least one slave station device, an identifier of a slave station device list, or an identifier of a terminal apparatus; and the second redundancy identification information includes at least one of the following information: an identifier of a master station device, an identifier of the at least one slave station device, an identifier of a slave station device list, and an identifier of a terminal apparatus. The identifier of the terminal apparatus includes an identifier of the first terminal apparatus and/or an identifier of the second terminal apparatus. Redundancy identification information includes at least one of the following information: the identifier of the master station device, the identifier of the at least one slave station device, the identifier of the slave station device list, and the identifiers of the two terminal apparatuses. Therefore, the access network device can determine the correspondence between the two terminal apparatuses based on the identifier of the master station device, the identifier of the at least one slave station device, the identifier of the slave station device list, or the identifiers of the two terminal apparatuses in the two pieces of redundancy identification information.

In a possible design, the communication method provided in this embodiment of this application further includes: The access network device receives a first redundancy sequence number (RSN) from the first terminal apparatus and a second RSN from the second terminal apparatus. An RSN is used to identify a sequence number of a redundant path that serves the master station device. For example, the first RSN identifies the 1$^{st}$ redundant path, and the second RSN identifies the 2$^{nd}$ redundant path. Therefore, the access network device can distinguish between different redundant paths based on the first RSN and the second RSN.

In a possible design, the communication method provided in this embodiment of this application further includes: The access network device receives an identifier of a first logical channel from the first terminal apparatus and an identifier of a second logical channel from the second terminal apparatus. The first logical channel and the second logical channel each are used to transmit a data packet between the master station device and the slave station device. In this way, the access network device can further learn of, based on an identifier of a logical channel from a terminal apparatus, a logical channel used by the terminal apparatus to transmit the data packet.

In a possible design, the data packet includes type indication information, and the type indication information indicates that the data packet is data transmitted between the master station device and the slave station device, rather than data transmitted between the terminal apparatus and the access network device. In this way, after the terminal apparatus receives the data packet, if the data packet carries the type indication information, the terminal apparatus can learn that the data packet is data transmitted between the master station device and the slave station device, and then sends the data packet to the slave station device; if the data packet does not carry the type indication information, the terminal apparatus can learn that the data packet is data sent by the access network device to the terminal apparatus, and does not need to send the data packet to the slave station device.

In a possible design, the type indication information is carried in a MAC subheader, and the MAC subheader includes a bit and a LCID. The bit is for indicating that the data packet is data transmitted between the master station device and the slave station device; or the LCID has a preset value, and the preset value is for indicating that the data packet is data transmitted between the master station device and the slave station device. In other words, the type indication information is carried in the MAC subheader, and a MAC subheader of a MAC layer message is for indicating a type of the data packet.

In a possible design, the type indication information is carried in a MAC service data unit (SDU), the type indication information is a sequence number in the MAC SDU, the sequence number is a preset value, and the preset value is for indicating that the data packet is data transmitted between the master station device and the slave station device. In other words, the type indication information is carried in the MAC SDU, and a MAC SDU of a MAC layer message is for indicating a type of the data packet.

In a possible design, the communication method provided in this embodiment of this application further includes: The access network device sends first state indication information to the first terminal apparatus; and/or the access network device sends second state indication information to the second terminal apparatus, where the first state indication information indicates that the second path is in an active state or an inactive state, and the second state indication information indicates that the first path is in an active state or an inactive state.

In this way, when the access network device transmits a data packet exchanged between the master station device and the slave station device, if channel quality is poor, the access network device indicates, to the first terminal apparatus by using the first state indication information, that the second path is in the active state, and the access network device indicates, to the second terminal apparatus by using the second state indication information, that the first path is in the active state, so that a same data packet is transmitted along the two paths, to ensure data transmission reliability. If channel quality is good, the access network device indicates, to the first terminal apparatus by using the first state indication information, that the second path is in the active state, or the access network device indicates, to the second terminal apparatus by using the second state indication information, that the first path is in the active state, so that the data packet can be transmitted along one path, to save transmission resources. When the access network device transmits a data packet exchanged between the access network device and the terminal apparatus, the access network device indicates, to the first terminal apparatus by using the first state indication information, that the second path is in the inactive state, and the access network device indicates, to the second terminal apparatus by using the second state indication information, that the first path is in the inactive state. In this way, the data packet is no longer transmitted along the first path or the second path.

In a possible design, the first state indication information includes time information, and the first state indication information indicates to set, at a time point corresponding to the time information, the second path to be in the active state or the inactive state; and/or the second state indication information includes time information, and the second state indication information indicates to set, at a time point corresponding to the time information, the first path to be in the active state or the inactive state.

In this way, the access network device indicates, to the first terminal apparatus, a time point at which the second path is set to be in the active state or the inactive state, and/or the access network device indicates, to the second terminal apparatus, a time point at which the first path is set to be in the active state or the inactive state.

In a possible design, the first state indication information or the second state indication information is carried in a MAC subPDU, the MAC subPDU includes a MAC subheader and a MAC CE, the MAC subheader includes an LCID, and the LCID having a preset value is for indicating that a MAC CE corresponding to the MAC subheader includes the first state indication information or the second state indication information. In this way, the access network device transmits state indication information to the terminal apparatus by using the MAC subPDU.

According to a second aspect, an embodiment of this application provides a communication method. The method includes: After receiving a first data packet from an access network device, a terminal apparatus sends the first data packet to at least one slave station device. The terminal apparatus receives a second data packet. The first data packet includes data sent by a master station device to the at least one slave station device. The second data packet includes data sent by the at least one slave station device to the master station device, and the second data packet is obtained by processing a data packet the same as the first data packet by the at least one slave station device.

In this way, after receiving the first data packet from the access network device, the terminal apparatus sends the first data packet to the at least one slave station device, so that the first data packet is transmitted along the at least one slave station device. When a ring network topology structure is constituted by the access network device and the slave station device together with two terminal apparatuses (the current terminal apparatus and another terminal apparatus), the current terminal apparatus transmits the first data packet to the another terminal apparatus via the at least one slave station device. In other words, the another terminal apparatus receives a data packet obtained by transmitting the first data packet via the at least one slave station device. The another terminal apparatus transmits a data packet that is the same as the first data packet to the current terminal apparatus via the at least one slave station device. In other words, the current terminal apparatus receives a data packet obtained by transmitting the data packet the same as the first data packet via the at least one slave station device. That is, the current terminal apparatus receives the second data packet. When the first data packet or the data packet that is the same as the first data packet passes through the at least one slave station device, each of the at least one slave station device may read data sent by the master station device to the slave station device, and write data to be sent to the master station device into the data packet. Because same data packets are processed by at least one same slave station device, data packets finally received by the two terminal apparatuses (the current terminal apparatus and the another terminal apparatus) from the at least one slave station device are the same. In this way, data redundancy transmission is implemented, and data transmission reliability is improved.

In a possible design, the communication method provided in this embodiment of this application further includes: The terminal apparatus sends the second data packet to the access network device. In this way, a data packet is transmitted by the terminal apparatus to a wireless network via the at least one slave station device, so that the data packet that passes through the at least one slave station device can be returned to the master station device by using the wireless network.

In a possible design, the communication method provided in this embodiment of this application further includes: The terminal apparatus sends a correspondence between the terminal apparatus and another terminal apparatus to the access network device. In this way, when a ring network topology structure is constituted by the access network device and the at least one slave station device together with the two terminal apparatuses (the current terminal apparatus and the another terminal apparatus), the access network device can determine, based on the correspondence between the terminal apparatus and the another terminal apparatus, two terminal apparatuses to which the same first data packet is sent, and two terminal apparatuses that return mutually redundant (or backup) data packets.

In a possible design, the communication method provided in this embodiment of this application further includes: The terminal apparatus sends redundancy identification information to the access network device, where the redundancy identification information includes at least one of the following information: an identifier of the master station device, an identifier of the at least one slave station device, an identifier of a slave station device list, an identifier of the terminal apparatus, and an identifier of the another terminal apparatus. There is a correspondence between the another terminal apparatus and the terminal apparatus. The redundancy identification information includes at least one of the following information: the identifier of the master station device, the identifier of the at least one slave station device, the identifier of the slave station device list, the identifier of the terminal apparatus, and the identifier of the another terminal apparatus. Therefore, the access network device can determine the correspondence between the two terminal apparatuses based on the identifier of the master station device, the identifier of the at least one slave station device, the identifier of the slave station device list, or the identifiers of the two terminal apparatuses that have the correspondence in the redundancy identification information.

In a possible design, the communication method provided in this embodiment of this application further includes: The terminal apparatus sends a redundancy sequence number (RSN) to the access network device.

In a possible design, the communication method provided in this embodiment of this application further includes: The terminal apparatus sends a logical channel identifier to the access network device.

In a possible design, the communication method provided in this embodiment of this application further includes: The terminal apparatus receives transmission indication information from the access network device, where the transmission indication information indicates the terminal apparatus to stop transmitting the second data packet to the access network device. A data packet returned by the terminal apparatus to the access network device and a data packet returned by the another terminal apparatus to the access network device are mutually redundant (or backup). Therefore, after the access network device receives the data packet from the another terminal apparatus, the access network device does not need to receive the second data packet from the terminal apparatus. The terminal apparatus stops, based on the transmission indication information, transmitting the second data packet to the access network device, to save air interface resources.

In a possible design, the transmission indication information is carried in a medium access control (MAC) sub protocol data unit (subPDU), the MAC subPDU includes a MAC subheader and a MAC control element (CE), and the MAC subheader includes a logical channel identifier (LCID). The transmission indication information includes the LCID having a preset value, and the LCID having the preset value is for indicating the terminal apparatus to stop transmitting the second data packet to the access network device; or the LCID having a preset value is for indicating that a MAC CE corresponding to the MAC subheader includes the transmission indication information.

In a possible design, a length of the MAC CE is a preset length, and the MAC CE is for indicating the terminal apparatus to stop transmitting the second data packet to the access network device; the MAC CE includes an identifier of a preset logical channel, and the MAC CE is for indicating the terminal apparatus to stop transmitting, to the access network device, a second data packet corresponding to the preset logical channel; the MAC CE includes a sequence number of a data packet, and the MAC CE is for indicating the terminal apparatus to stop transmitting, to the access network device, a second data packet corresponding to the sequence number packet; or the MAC CE includes an identifier of a data radio bearer, and the MAC CE is for indicating the terminal apparatus to stop transmitting, to the access network device, a second data packet corresponding to the data radio bearer.

In a possible design, the preset length is 0.

In a possible design, the first data packet includes type indication information, and the type indication information indicates that the first data packet is data transmitted between the master station device and the slave station device.

In a possible design, the type indication information is carried in a medium access control (MAC) subheader, and the MAC subheader includes a bit and a logical channel identifier (LCID). The bit is for indicating that the data packet is data transmitted between the slave station device and the master station device; or the LCID has a preset value, and the preset value is for indicating that the data packet is data transmitted between the slave station device and the master station device; or the type indication information is carried in a MAC service data unit (SDU), the type indication information is a sequence number in the MAC SDU, the sequence number is a preset value, and the preset value is for indicating that the data packet is data transmitted between the slave station device and the master station device.

In a possible design, the communication method provided in this embodiment of this application further includes: The terminal apparatus receives state indication information from the access network device, where the state indication information indicates that a path is in an active state or an inactive state, and the path is from the terminal apparatus to the another terminal apparatus via the at least one slave station device. The terminal apparatus sets, based on the state indication information, the path to be in the active state or the inactive state.

In a possible design, the state indication information includes time information, and the state indication information indicates to set, at a time point corresponding to the time information, the path to be in the active state or the inactive state.

In a possible design, the state indication information is carried in a MAC subPDU, the MAC subPDU includes a MAC subheader and a MAC CE, the MAC subheader includes an LCID, and the LCID having a preset value is for indicating that a MAC CE corresponding to the MAC subheader includes the state indication information.

According to a third aspect, an embodiment of this application provides a communication method. The method includes: After receiving a first data packet from an access network device, a first terminal apparatus sends the first data packet to at least one slave station device. The first terminal apparatus receives a second data packet. The first data packet includes data sent by a master station device to the at least one slave station device. The second data packet includes data sent by the at least one slave station device to the master station device, and the second data packet is obtained by processing a data packet the same as the first data packet by the at least one slave station device.

In a possible design, the communication method provided in this embodiment of this application further includes: The first terminal apparatus sends the second data packet to the access network device.

In a possible design, the communication method provided in this embodiment of this application further includes: The first terminal apparatus sends a correspondence between the first terminal apparatus and a second terminal apparatus to the access network device.

In a possible design, the communication method provided in this embodiment of this application further includes: The first terminal apparatus sends redundancy identification information to the access network device, where the redundancy identification information includes at least one of the following information: an identifier of the master station device, an identifier of the at least one slave station device, an identifier of a slave station device list, an identifier of the first terminal apparatus, and an identifier of the second terminal apparatus. There is a correspondence between the second terminal apparatus and the first terminal apparatus.

In a possible design, the communication method provided in this embodiment of this application further includes: The first terminal apparatus sends a redundancy sequence number (RSN) to the access network device.

In a possible design, the communication method provided in this embodiment of this application further includes: The first terminal apparatus sends a logical channel identifier to the access network device.

In a possible design, the first data packet includes type indication information, and the type indication information indicates that the first data packet is data transmitted between the master station device and the slave station device.

In a possible design, the type indication information is carried in a medium access control (MAC) subheader, and the MAC subheader includes a bit and a logical channel identifier (LCID). The bit is for indicating that the first data packet is data transmitted between the master station device and the slave station device; or the LCID has a preset value, and the preset value is for indicating that the first data packet is data transmitted between the master station device and the slave station device; or the type indication information is carried in a MAC service data unit (SDU), the type indication information is a sequence number in the MAC SDU, the sequence number is a preset value, and the preset value is for indicating that the first data packet is data transmitted between the master station device and the slave station device.

In a possible design, the communication method provided in this embodiment of this application further includes: The first terminal apparatus receives state indication information from the access network device, where the state indication information indicates that a path is in an active state or an inactive state, and the path is from the first terminal apparatus to the second terminal apparatus via the at least one slave station device. The first terminal apparatus sets, based on the state indication information, the path to be in the active state or the inactive state.

In a possible design, the state indication information includes time information, and the state indication information indicates to set, at a time point corresponding to the time information, the path to be in the active state or the inactive state.

In a possible design, the state indication information is carried in a MAC subPDU, the MAC subPDU includes a MAC subheader and a MAC CE, the MAC subheader includes an LCID, and the LCID having a preset value is for indicating that a MAC CE corresponding to the MAC subheader includes the state indication information.

According to a fourth aspect, an embodiment of this application provides a communication method. The method includes: After receiving a first data packet from an access network device, a second terminal apparatus sends the first data packet to at least one slave station device. The second terminal apparatus receives a second data packet. The first data packet includes data sent by a master station device to the at least one slave station device. The second data packet includes data sent by the at least one slave station device to the master station device, and the second data packet is obtained by processing a data packet the same as the first data packet by the at least one slave station device.

In a possible design, the communication method provided in this embodiment of this application further includes: The second terminal apparatus sends a correspondence between the second terminal apparatus and a first terminal apparatus to the access network device.

In a possible design, the communication method provided in this embodiment of this application further includes: The second terminal apparatus sends redundancy identification information to the access network device, where the redundancy identification information includes at least one of the following information: an identifier of the master station device, an identifier of the at least one slave station device, an identifier of a slave station device list, an identifier of the second terminal apparatus, and an identifier of the first terminal apparatus. There is a correspondence between the first terminal apparatus and the second terminal apparatus.

In a possible design, the communication method provided in this embodiment of this application further includes: The second terminal apparatus sends a redundancy sequence number (RSN) to the access network device.

In a possible design, the communication method provided in this embodiment of this application further includes: The second terminal apparatus sends a logical channel identifier to the access network device.

In a possible design, the communication method provided in this embodiment of this application further includes: The second terminal apparatus receives transmission indication information from the access network device, where the transmission indication information indicates the second terminal apparatus to stop transmitting the second data packet to the access network device.

In a possible design, the transmission indication information is carried in a medium access control (MAC) sub protocol data unit (PDU), the MAC subPDU includes a MAC subheader and a MAC control element (CE), and the MAC subheader includes a logical channel identifier (LCID). The transmission indication information includes the LCID having a preset value, and the LCID having the preset value is for indicating the second terminal apparatus to stop transmitting the second data packet to the access network device; or the LCID having a preset value is for indicating that a MAC CE corresponding to the MAC subheader includes the transmission indication information.

In a possible design, a length of the MAC CE is a preset length, and the MAC CE is for indicating the second terminal apparatus to stop transmitting the second data packet to the access network device; the MAC CE includes an identifier of a preset logical channel, and the MAC CE is for indicating the second terminal apparatus to stop transmitting, to the access network device, a second data packet corresponding to the preset logical channel; the MAC CE includes a sequence number of a data packet, and the MAC CE is for indicating the second terminal apparatus to stop transmitting, to the access network device, a second data packet corresponding to the sequence number; or the MAC CE includes an identifier of a data radio bearer, and the MAC CE is for indicating the second terminal apparatus to stop transmitting, to the access network device, a second data packet corresponding to the data radio bearer.

In a possible design, the preset length is 0.

In a possible design, the first data packet includes type indication information, and the type indication information indicates that the first data packet is data transmitted between the master station device and the slave station device.

In a possible design, the type indication information is carried in a medium access control (MAC) subheader, and the MAC subheader includes a bit and a logical channel identifier (LCID). The bit is for indicating that the first data packet is data transmitted between the master station device and the slave station device; or the LCID has a preset value, and the preset value is for indicating that the first data packet is data transmitted between the master station device and the slave station device; or the type indication information is carried in a MAC service data unit (SDU), the type indication information is a sequence number in the MAC SDU, the sequence number is a preset value, and the preset value is for indicating that the first data packet is data transmitted between the master station device and the slave station device.

In a possible design, the communication method provided in this embodiment of this application further includes: The second terminal apparatus receives state indication information from the access network device, where the state indication information indicates that a path is in an active state or an inactive state, and the path is from the second terminal apparatus to another second terminal apparatus via the at least one slave station device. The second terminal apparatus sets, based on the state indication information, the path to be in the active state or the inactive state.

In a possible design, the state indication information includes time information, and the state indication information indicates to set, at a time point corresponding to the time information, the path to be in the active state or the inactive state.

In a possible design, the state indication information is carried in a MAC subPDU, the MAC subPDU includes a MAC subheader and a MAC CE, the MAC subheader includes an LCID, and the LCID having a preset value is for indicating that a MAC CE corresponding to the MAC subheader includes the state indication information.

According to a fifth aspect, an embodiment of this application provides a communication method. The method includes: After determining a correspondence between a first terminal apparatus and a second terminal apparatus, a core network device sends correspondence indication information to a first access network device. The correspondence indication information indicates the correspondence between the first terminal apparatus and the second terminal apparatus.

In this way, when a ring network topology structure is constituted by the access network device and a slave station device together with the two terminal apparatuses, the access network device obtains the correspondence between the two terminal apparatuses from the core network device. After obtaining a data packet, the access network device separately sends the same data packet to the two terminal apparatuses. One of the data packets is returned to the access network device via one terminal apparatus, at least one slave station device, and another terminal apparatus. The other data packet is returned to the access network device via the another terminal apparatus, the at least one slave station device, and one terminal apparatus. When the data packet passes through each slave station device, the slave station device may read data sent by a master station device to the slave station device, and write data to be sent to the master station device into the data packet. Because data packets sent by the access network device to the two terminal apparatuses are the same, and the same data packets are processed by a same slave station device, the data packets finally returned by the two terminal apparatuses to the access network device are the same. In this way, data redundancy transmission is implemented, and data transmission reliability is improved.

In a possible design, that the core network device determines a correspondence between a first terminal apparatus and a second terminal apparatus includes: The core network device determines the correspondence between the first terminal apparatus and the second terminal apparatus based on subscription information of the first terminal apparatus and subscription information of the second terminal apparatus; or the core network device obtains first redundancy identification information from the first terminal apparatus and second redundancy identification information from the second terminal apparatus, and determines the correspondence between the first terminal apparatus and the second terminal apparatus based on the first redundancy identification information and the second redundancy identification information. In this way, the core network device can obtain the correspondence between the two terminal apparatuses.

In a possible design, the first redundancy identification information includes at least one of the following information: an identifier of a master station device, an identifier of the at least one slave station device, an identifier of a slave station device list, and an identifier of a terminal apparatus; and the second redundancy identification information includes at least one of the following information: an identifier of a master station device, an identifier of the at least one slave station device, an identifier of a slave station device list, and an identifier of a terminal apparatus. The identifier of the terminal apparatus includes an identifier of the first terminal apparatus and/or an identifier of the second terminal apparatus.

According to a sixth aspect, an embodiment of this application provides a communication apparatus. The communication apparatus includes units configured to perform the steps in any one of the foregoing aspects. The communication apparatus may be the access network device in the first aspect, or an apparatus including the access network device; the communication apparatus may be the terminal apparatus in the second aspect, or an apparatus including the terminal apparatus; the communication apparatus may be the first terminal apparatus in the third aspect, or an apparatus including the first terminal apparatus; the communication apparatus may be the second terminal apparatus in the fourth aspect, or an apparatus including the second terminal apparatus; or the communication apparatus may be the core network device in the fifth aspect, or an apparatus including the core network device.

According to a seventh aspect, an embodiment of this application provides a communication apparatus, including a processor and an interface circuit. The processor is configured to: communicate with another apparatus by using the interface circuit, and perform the communication method provided in any one of the foregoing aspects. There are one or more processors. The communication apparatus may be the access network device in the first aspect, or an apparatus including the access network device; the communication apparatus may be the terminal apparatus in the second aspect, or an apparatus including the terminal apparatus; the communication apparatus may be the first terminal apparatus in the third aspect, or an apparatus including the first terminal apparatus; the communication apparatus may be the second terminal apparatus in the fourth aspect, or an apparatus including the second terminal apparatus; or the communication apparatus may be the core network device in the fifth aspect, or an apparatus including the core network device.

According to an eighth aspect, an embodiment of this application provides a communication apparatus, including a processor. The processor is connected to a memory, to invoke a program stored in the memory to perform the communication method provided in any one of the foregoing aspects. The memory may be located inside the communication apparatus, or may be located outside the communication apparatus. In addition, there are one or more processors. The communication apparatus may be the access network device in the first aspect, or an apparatus including the access network device; the communication apparatus may be the terminal apparatus in the second aspect, or an apparatus including the terminal apparatus; the communication apparatus may be the first terminal apparatus in the third aspect, or an apparatus including the first terminal apparatus; the communication apparatus may be the second terminal apparatus in the fourth aspect, or an apparatus including the second terminal apparatus; or the communication apparatus may be the core network device in the fifth aspect, or an apparatus including the core network device.

According to a ninth aspect, an embodiment of this application provides a communication apparatus, including at least one processor and at least one memory, where the at least one processor is configured to perform the communication method provided in any one of the foregoing aspects. The communication apparatus may be the access network device in the first aspect, or an apparatus including the access network device; the communication apparatus may be the terminal apparatus in the second aspect, or an apparatus including the terminal apparatus; the communication apparatus may be the first terminal apparatus in the third aspect, or an apparatus including the first terminal apparatus; the communication apparatus may be the second terminal apparatus in the fourth aspect, or an apparatus including the second terminal apparatus; or the communication apparatus may be the core network device in the fifth aspect, or an apparatus including the core network device.

According to a tenth aspect, an embodiment of this application provides a computer-readable storage medium. The computer-readable storage medium stores instructions, and when the instructions are run on a computer, the computer is enabled to perform the communication method in any one of the foregoing aspects.

According to an eleventh aspect, an embodiment of this application provides a computer program product including instructions. When the computer program product runs on a computer, the computer is enabled to perform the communication method in any one of the foregoing aspects.

According to a twelfth aspect, an embodiment of this application provides a circuit system. The circuit system includes a processing circuit, and the processing circuit is configured to perform the communication method in any one of the foregoing aspects.

According to a thirteenth aspect, an embodiment of this application provides a chip. The chip includes a processor, the processor is coupled to a memory, the memory stores program instructions, and when the program instructions stored in the memory are executed by the processor, the communication method in any one of the foregoing aspects is implemented.

According to a fourteenth aspect, an embodiment of this application provides a communication system. The communication system includes the access network device and the terminal apparatus in any one of the foregoing aspects, and the core network device in any one of the foregoing aspects, or the communication system includes the access network device, the first terminal apparatus, and the second terminal apparatus in any one of the foregoing aspects and the core network device in any one of the foregoing aspects.

For technical effects brought by any design in the second aspect to the fourteenth aspect, refer to technical effects brought by different designs in the first aspect. Details are not described herein again.

DESCRIPTION OF EMBODIMENTS

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that, in embodiments of this application, the term such as "example" or "for example" is used to represent giving an example, an illustration, or descriptions. Any embodiment or design scheme described as an "example" or "for example" in embodiments in this application should not be explained as being more preferable or having more advantages than another embodiment or design scheme. Exactly, use of the word such as "example" or "for example" is intended to present a related concept in a specific manner.

Technical terms used in embodiments of this application are first described.

Redundancy transmission means that same service data can still be transmitted along at least one redundant path in addition to service data transmission performed through a normal transmission path, to ensure a reliability requirement of service data transmission.

For example, in the field of industrial Ethernet, a communication system includes a master station device and a slave station device. The master station device and the slave station device are communicatively connected in a wired manner. A quantity of slave station devices is denoted as N, and N is a positive integer greater than or equal to 1. Slave station devices are also communicatively connected to each other in a wired manner. All the slave station devices are controlled by the master station device. The master station device and the slave station device each include a transmit unit and a receive unit.

If the communication system in the industrial Ethernet does not use a redundancy transmission mechanism, for example, if a network adapter is installed on the master station device, where a medium access control (MAC) address of the network adapter may be denoted as MAC 1, the master station device exchanges data (or communicates) with the slave station device through a dedicated service channel by using the network adapter.

Figure 1A:
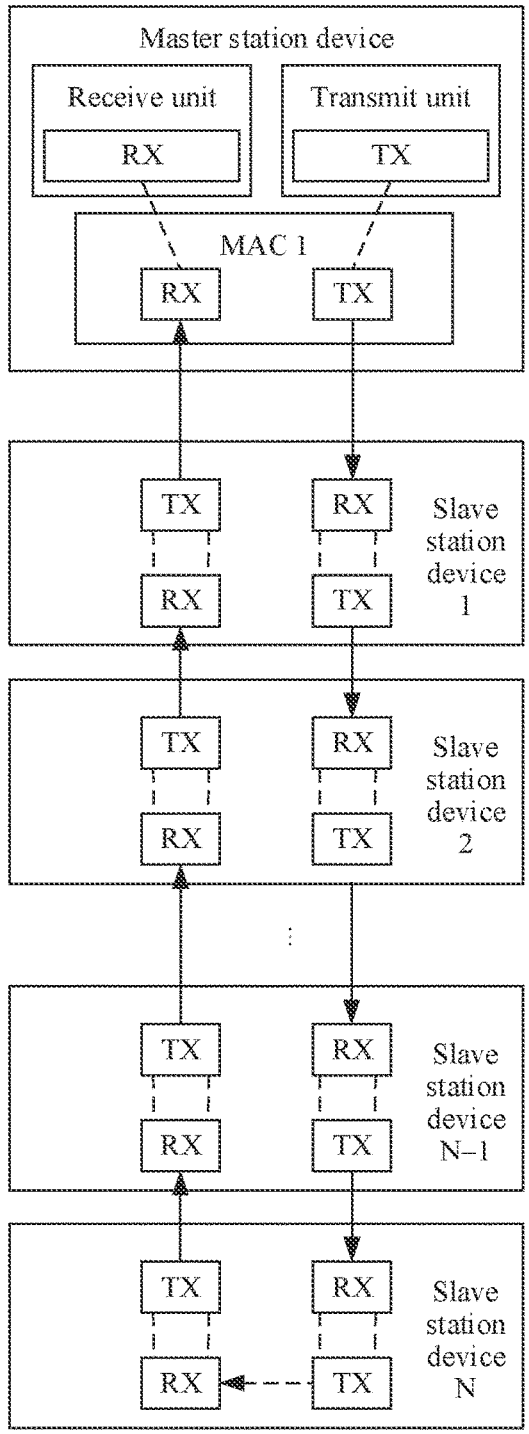
FIG. 1(a) and FIG. 1(b) are a schematic diagram of a structure of an industrial Ethernet according to a related technology.

When the communication system in the industrial Ethernet does not use the redundancy transmission mechanism but works normally, a data packet is transmitted through a dedicated service channel. When a data packet sent by the master station device passes through each slave station device, the slave station device reads data sent by the master station device to the slave station device, inserts input data into the data packet, and forwards the data packet to a next slave station device connected to the slave station device. The last slave station device in a network segment returns the processed data packet, and then the processed data packet is returned to the master station device by sequentially passing through the slave station devices. For example, as shown in FIG. 1(a), in a master station device, a transmit unit sends a data packet by using a network adapter (where a MAC address of the network adapter is MAC 1). The data packet is returned at the slave station device N by sequentially passing through N slave station devices (a slave station device 1, a slave station device 2, . . . , a slave station device N−1, and a slave station device N), and returned to the network adapter of the master station device by sequentially passing through the N slave station devices. The network adapter sends the data packet to a receive unit. Each of the N slave station devices includes two transmit units and two receive units.

For the slave station device 1, one receive unit receives the data packet from the master station device. The slave station device 1 may read data from the data packet received by the receive unit, or insert input data into the data packet, and one transmit unit sends the data packet to the slave station device 2. The other receive unit of the slave station device 1 receives the data packet from the slave station device 2. The slave station device 1 may read data from the data packet received by the receive unit, or insert input data into the data packet, and the other transmit unit sends the data packet to the master station device.

For a slave station device i, one receive unit receives the data packet from a slave station device i−1, the slave station device i may read data from the data packet received by the receive unit, or insert input data into the data packet, and one transmit unit sends the data packet to a slave station device i+1. The other receive unit of the slave station device i receives the data packet from the slave station device i+1. The slave station device i may read data from the data packet received by the receive unit, or insert input data into the data packet, and the other transmit unit sends the data packet to the slave station device i−1, where i=2, 3, . . . . N−1.

For the slave station device N, one receive unit receives the data packet from the slave station device N−1, the slave station device N may read data from the data packet received by the receive unit, or insert input data into the data packet, and one transmit unit transmits the data packet to the other receive unit of the slave station device N. After receiving the data packet, the other receive unit transmits the data packet to the other transmit unit, and the other transmit unit sends the data packet to the slave station device i−1.

Solid lines with arrows in FIG. 1(a) indicate a process of transmitting the data packet between the devices (for example, between the master station device and the slave station device or between the slave station devices). Dashed lines in FIG. 1(a) indicate a process of transmitting the data packet in the master station device or the slave station device.

Figure 1B:
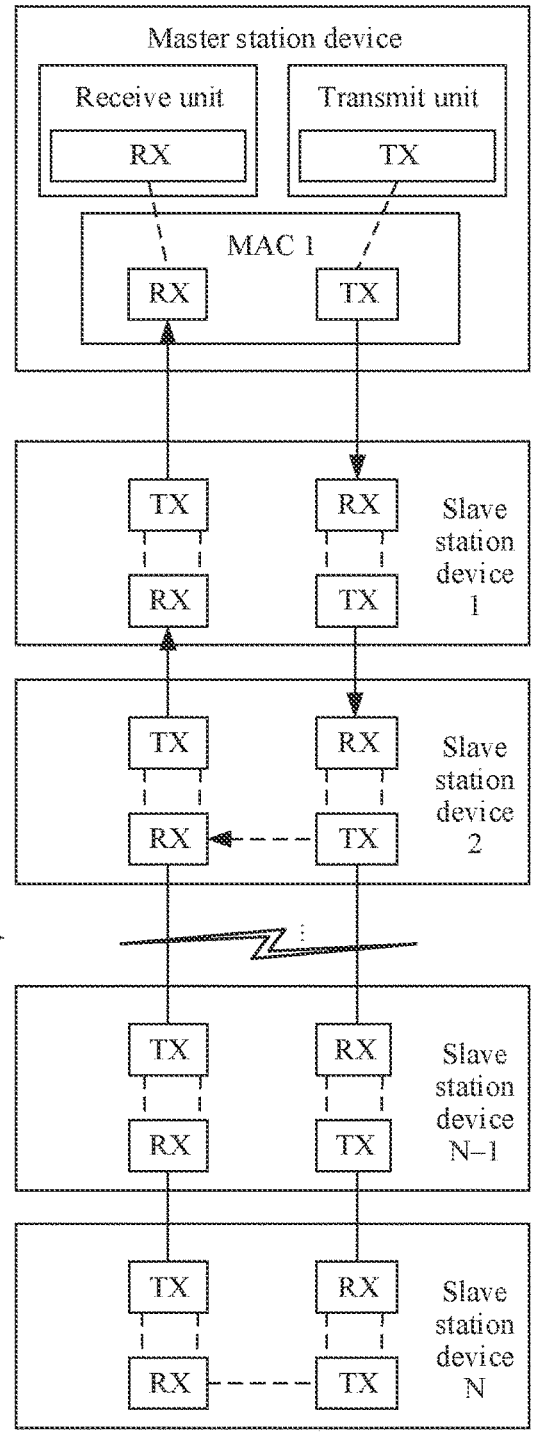

When the communication system in the industrial Ethernet does not use the redundancy transmission mechanism and a system fault occurs, some slave station devices cannot normally communicate with the master station device, affecting transmission reliability of data. Herein, a system fault may be caused when one or more of a plurality of slave station devices are faulty, or when a link for connecting two adjacent slave station devices is faulty. A dedicated service channel forms a self-loop at the faulty link or faulty slave station device, and a data packet is transmitted to a slave station device that is in normal communication, so that the data packet is returned to the master station device. For example, as shown in FIG. 1(b), a link for connecting a slave station device 2 and a slave station device 3 is faulty, and a dedicated service channel forms a self-loop at the slave station device 2. A data packet sent by the master station device is returned to the master station device by sequentially passing through the slave station device 1, the slave station device 2, and the slave station device 1. Solid lines with arrows in FIG. 1(b) indicate a process of transmitting the data packet between the devices. Dashed lines in FIG. 1(b) indicate a process of transmitting the data packet in the master station device or the slave station device. A lightning symbol indicates that a link is faulty.

If the communication system in the industrial Ethernet uses the redundancy transmission mechanism, for example, if two network adapters are installed on the master station device, where MAC addresses of the two network adapters may be respectively denoted as MAC 1 and MAC 2, the master station device exchanges data with the slave station device through two dedicated service channels by using the two network adapters. One dedicated service channel is from a transmit end of a first network adapter (for example, the network adapter whose MAC address is MAC 1) to a receive end of a second network adapter (for example, the network adapter whose MAC address is MAC 2) via the slave station device. In other words, the master station device and the slave station device can form a ring network topology structure. The other dedicated service channel is from a transmit end of the second network adapter (for example, the network adapter whose MAC address is MAC 2) to a receive end of the first network adapter (for example, the network adapter whose MAC address is MAC 1) via the slave station device. In other words, the master station device and the slave station device can form another ring network topology structure.

Figure 2A:
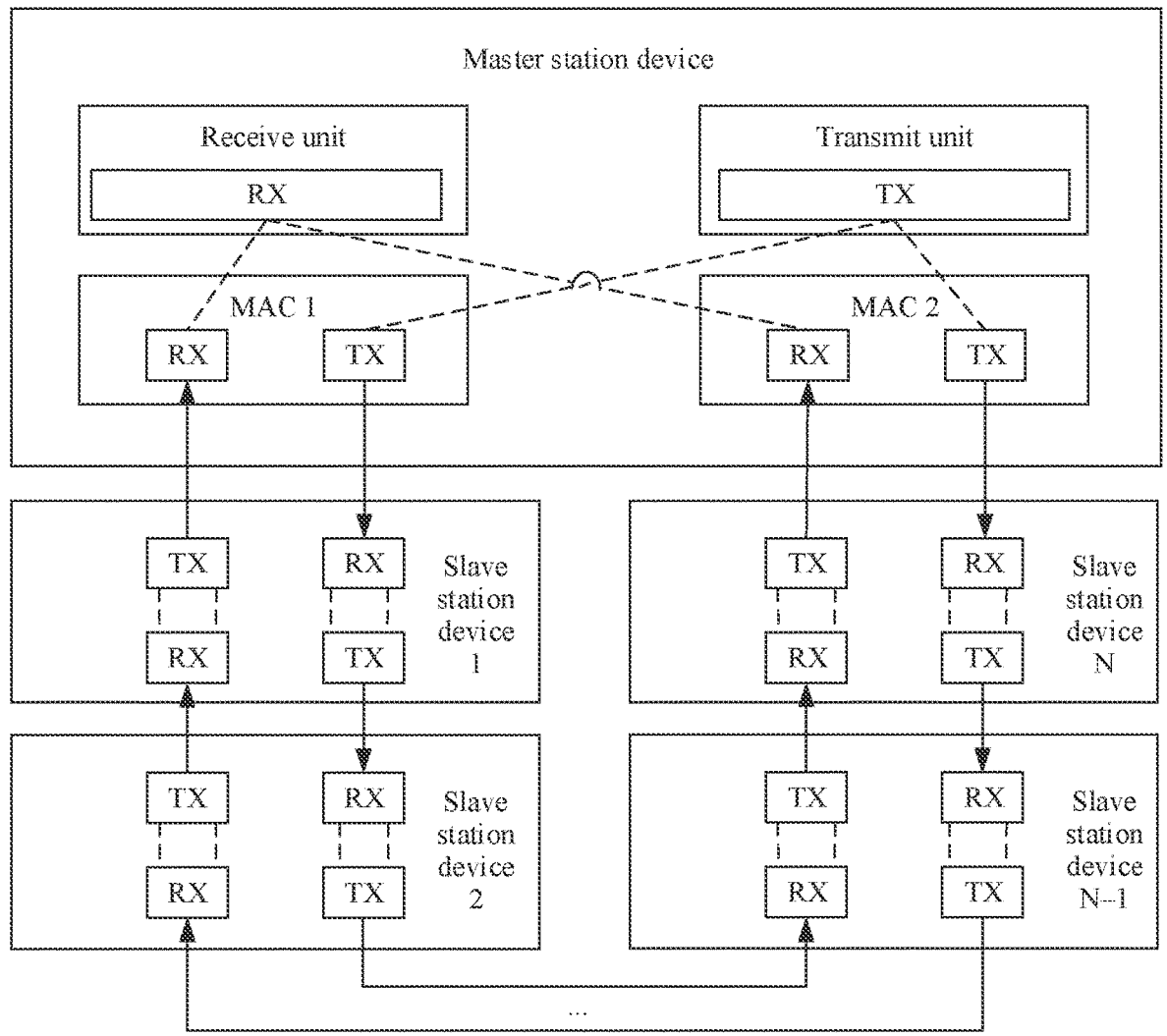
FIG. 2(a) is a schematic diagram of another industrial Ethernet in a normal working state according to a related technology.

When the communication system in the industrial Ethernet uses the redundancy transmission mechanism and works normally, data packet transmission is performed through two dedicated service channels. As shown in FIG. 2(a), on one dedicated service channel, in a master station device, a transmit unit sends a data packet by using a first network adapter (where a MAC address of the network adapter is MAC 1). The data packet is returned to a second network adapter (where a MAC address of the network adapter is MAC 2) of the master station device via N slave station devices (a slave station device 1, a slave station device 2, . . . , a slave station device N−1, and a slave station device N). In a process in which the data packet passes through each slave station device, the slave station device reads data sent by the master station device to the slave station device, inserts input data into the data packet, and forwards the data packet to a next slave station device connected to the slave station device. The last slave station device (namely, the slave station device N) in a network segment returns the processed data packet to the master station device. On the other dedicated service channel, in the master station device, the transmit unit sends a data packet by using the second network adapter (where the MAC address of the network adapter is MAC 2). The data packet is returned to the first network adapter (where the MAC address of the network adapter is MAC 1) of the master station device via the N slave station devices (the slave station device N, the slave station device N−1, . . . , the slave station device 2, and the slave station device 1). In a process in which the data packet passes through each slave station device, the slave station device reads data sent by the master station device to the slave station device, inserts input data into the data packet, and forwards the data packet to a next slave station device connected to the slave station device. The last slave station device (namely, the slave station device 1) in a network segment returns the processed data packet to the master station device. Solid lines with arrows in FIG. 2(a) indicate a process of transmitting the data packet between the devices, and dashed lines indicate a process of transmitting the data packet in the master station device or the slave station device.

Figure 2B:
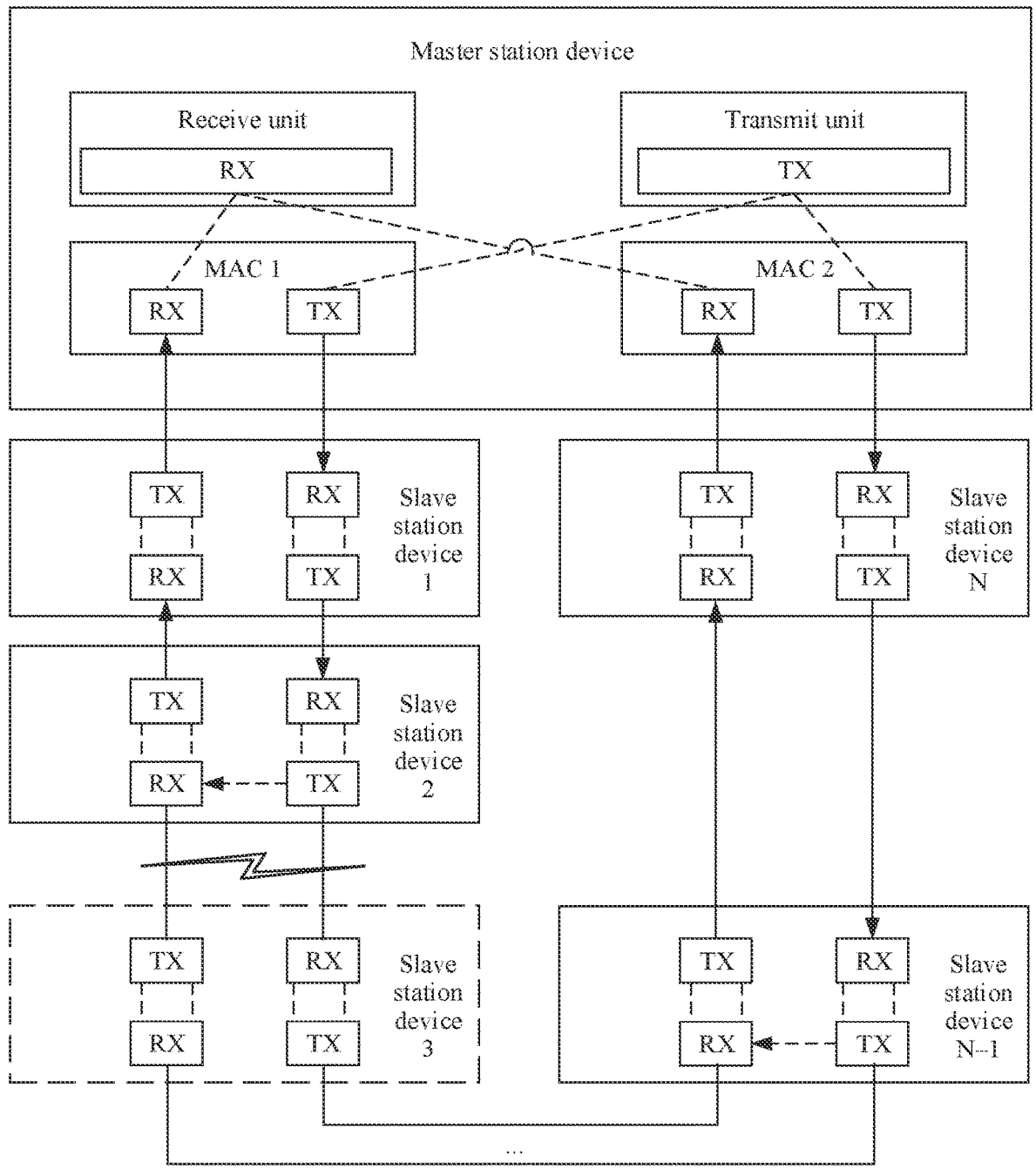
FIG. 2(b) is a schematic diagram of still another industrial Ethernet in a fault state according to a related technology.

When the communication system in the industrial Ethernet uses the redundancy transmission mechanism and a system fault occurs, for example, when one or more of a plurality of slave station devices are faulty, or when a link for connecting two adjacent slave station devices is faulty, two dedicated service channels both form self-loops at the faulty link or faulty slave station device, and a data packet is transmitted to a slave station device that is in normal communication, so that the data packet is returned to the master station device. For example, as shown in FIG. 2(b), a link for connecting a slave station device 2 and a slave station device 3 is faulty. In addition, as shown by a dashed-line box in FIG. 2(b), the slave station device 3 is also faulty. One dedicated service channel forms a self-loop at the slave station device 2, and the other dedicated service channel forms a self-loop at a normal slave station device following the faulty slave station device. In FIG. 2(b), an example in which "a self-loop is formed at a slave station device N−1" is used for description. A data packet sent by a master station device from a first network adapter (where a MAC address of the network adapter is MAC 1) is returned to the first network adapter of the master station device by sequentially passing through a slave station device 1, the slave station device 2, and the slave station device 1. A data packet sent by the master station device from a second network adapter (where a MAC address of the network adapter is MAC 2) is returned to the second network adapter of the master station device by sequentially passing through a slave station device N, the slave station device N−1, and the slave station device N. In FIG. 2(b), solid lines with arrows indicate a process of transmitting the data packet between the devices, dashed lines indicate a process of transmitting the data packet in the slave station device or the master station device, a lightning symbol indicates that a link is faulty, and a dashed box indicates a faulty slave station device. Compared with the scenario shown in FIG. 1(b), in this scenario, the communication system using the redundancy transmission mechanism can reduce impact caused by a system fault, and ensure that more slave station devices can normally communicate with the master station device.

Figure 3:
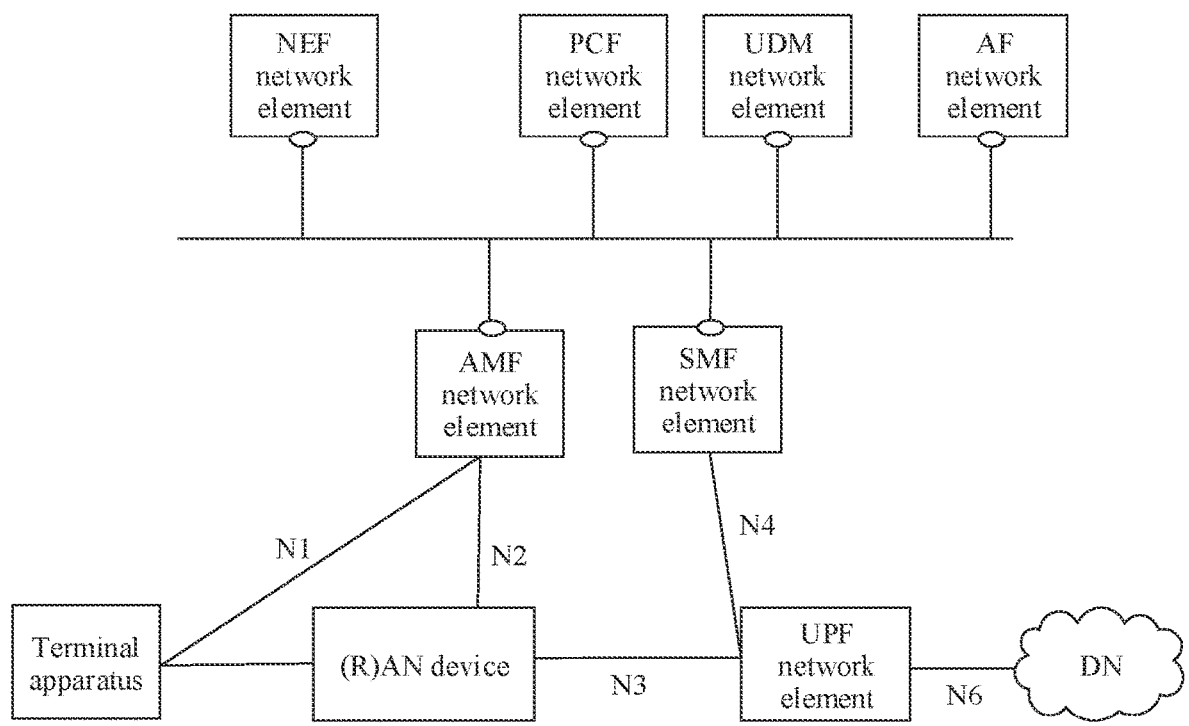
FIG. 3 is a diagram of a network architecture according to a related technology.

However, all devices in the communication system using the redundancy transmission mechanism are connected in a wired manner, and this is not conducive to network expansion and has a problem of difficult cabling. However, the redundancy transmission mechanism of a mobile communication technology does not support data transmission on the industrial Ethernet. A fifth generation (5G) mobile communication technology is used as an example. FIG. 3 shows a 5G network architecture. In the 5G network architecture, a core network is divided into a control plane (CP) and a user plane (UP). The UP includes a user plane function (UPF)) network element. The CP includes an access and mobility management function (AMF) network element, a session management function (SMF) network element, a policy control function (PCF) network element, a unified data management (UDM) network element, a network exposure function (NEF) network element, and the like. The 5G network architecture may further include an application function (AF) network element. The SMF network element controls the UPF network element through an N4 interface. The AMF network element exchanges information with a (radio) access network ((R)AN) device through an N2 interface and with a terminal apparatus through an N1 interface, to complete functions such as registration, session establishment, and mobility management. The AN device exchanges information with the UPF network element through an N3 interface. The UPF network element exchanges information with a data network (DN) through an N6 interface.

Main functions of the network elements are as follows:

The AMF network element has functions such as mobility management, registration management, connection management, lawful interception, access authentication, and access authorization of the terminal apparatus, and supports transmission of session management (SM) information between the terminal apparatus and the SMF network element.

The SMF network element has functions such as session management and roaming.

The session management function includes session establishment, modification, and release. The roaming function may include charging data collection and supporting of signaling transmission for authentication/authorization with an external data network (DN).

The PCF network element has a user subscription information management function, a policy control function, a charging policy control function, quality of service (QoS) control, and the like.

The UPF network element is a function network element of the user plane, and is mainly responsible for connecting to an external network and processing a user packet, such as forwarding, charging, and lawful interception. Optionally, the processing may further be receiving data.

The UDM network element has functions such as authentication certificate processing, user identification processing, access authorization, registration and mobility management, subscription management, and SMS message management.

The DN is a network that provides a service for the terminal apparatus, for example, provides a network access function and an SMS message function.

The AF network element may be specifically an application server, and may be configured to interact with the PCF network element to customize a policy for an application.

Network functions that can be provided by the NEF network element include externally providing a service and a capability of the network element, an application function, and edge computing.

Figure 4:
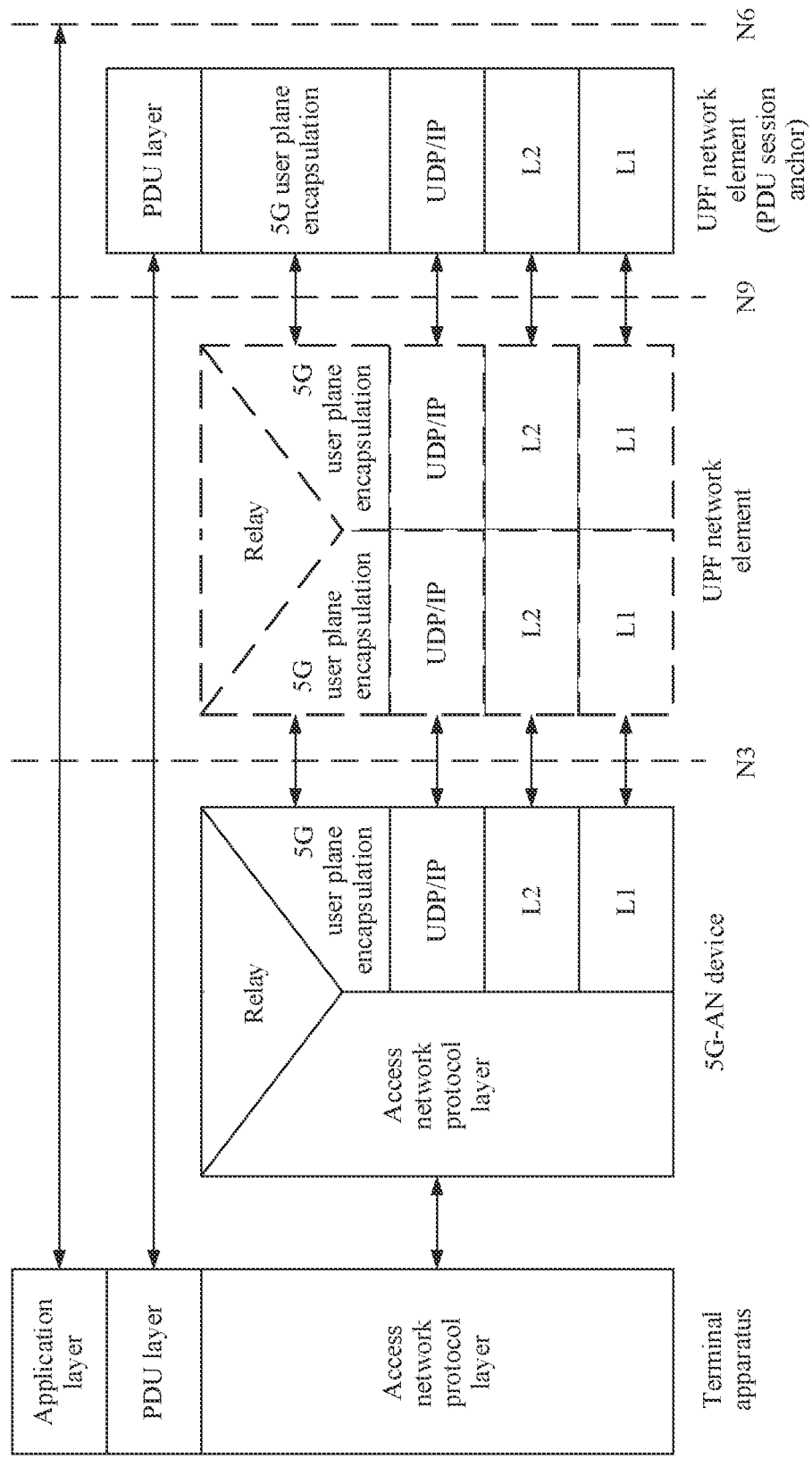
FIG. 4 shows a user plane protocol stack according to a related technology.

FIG. 4 shows a user plane protocol stack of a 5G mobile communication technology. A protocol stack of a terminal apparatus includes an application layer, a packet data unit (PDU) layer, and an access network protocol layer from top to bottom. A protocol stack for communication between an AN device and the terminal apparatus includes the access network protocol layer. A protocol stack for communication between the AN device and a UPF network element includes a 5G user plane encapsulation layer, a user datagram protocol (UDP) layer/an internet protocol (IP) layer, an L2 layer, and an L1 layer from top to bottom. Relay represents mapping, in an uplink direction, a user plane packet from an AN protocol stack (for example, a packet data convergence protocol (PDCP) layer) to a 5G user plane protocol stack (for example, a general packet radio service tunneling protocol-user plane (GTP-U) layer), and mapping, in a downlink direction, the user plane packet from the 5G user plane protocol stack (for example, the GTP-U layer) to the AN protocol stack (for example, the PDCP layer). The protocol stack for communication between the UPF network element and the AN device includes the 5G user plane encapsulation layer, the UDP layer/IP layer, the L2 layer, and the L1 layer from top to bottom. A protocol stack for communication between the UPF network element and a UPF network element used as a PDU session anchor includes the 5G user plane encapsulation layer, the UDP layer/IP layer, the L2 layer, and the L1 layer from top to bottom. Relay represents mapping, in an uplink direction, a user plane packet from an N3-port 5G user plane protocol stack (for example, the GTP-U layer) to an N9-port 5G user plane protocol stack (for example, the GTP-U layer), and mapping, in a downlink direction, the user plane packet from the N9-port 5G user plane protocol stack (for example, the GTP-U layer) to the N3-port 5G user plane protocol stack (for example, the GTP-U layer). A protocol stack of the UPF network element used as the PDU session anchor includes the PDU layer, the 5G user plane encapsulation layer, the UDP layer/IP layer, the L2 layer, and the L1 layer from top to bottom.

Herein, both the terminal apparatus and the UPF network element used as the PDU session anchor have the PDU layer. The PDU layer may perform internet protocol (IP)/medium access control (MAC) address identification, and then map a MAC address to a PDU session, to transmit a data packet.

To ensure reliability of an ultra-reliable low-latency communication (URLLC) service, two protocol data unit (PDU) sessions are used to send the data packet.

Figure 5:
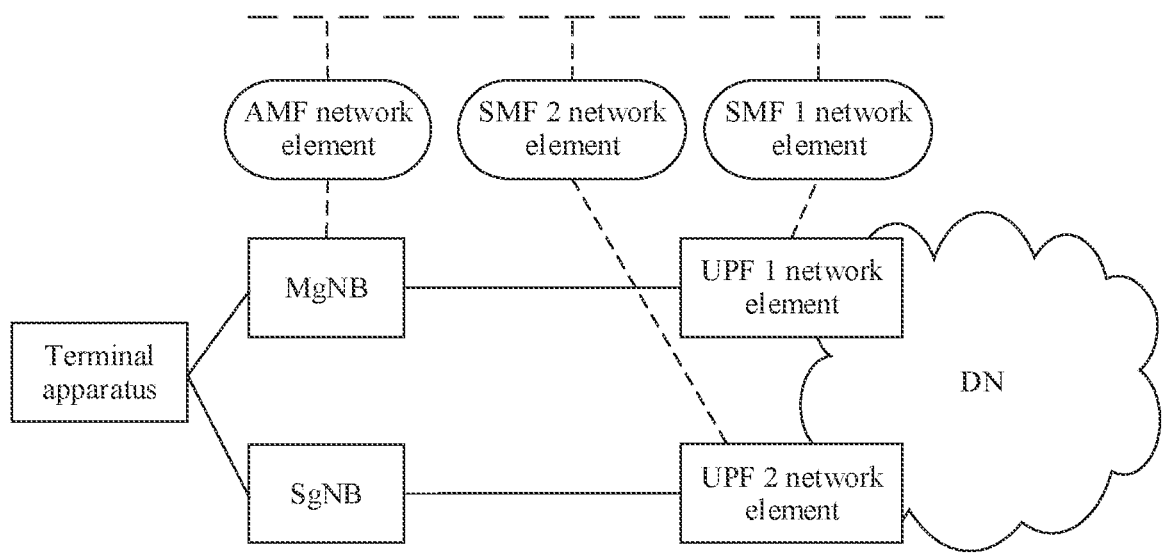
FIG. 5 is a diagram of another network architecture according to a related technology.

In a possible design, a redundant PDU session is established based on dual connectivity. FIG. 5 shows a network architecture based on dual connectivity (DC). One terminal apparatus may access a core network device (for example, a UPF 1 network element and a UPF 2 network element) through two base stations. Herein, an example in which the base station is a 5G base station (gNB) is used for description. One base station is used as a master base station (MgNB), and the other base station is used as a secondary base station (SgNB). The master base station may exchange control plane signaling with an AMF network element, or may exchange user plane data with a UPF network element. The master base station may determine whether to enable the secondary base station. The secondary base station does not exchange the control plane signaling with the AMF network element. Therefore, the secondary base station does not access the AMF network element. The secondary base station may alternatively exchange the user plane data with the UPF 2 network element. In FIG. 5, a dashed line shows a path on which the control plane signaling can be exchanged, and a solid line shows a path on which the user plane data can be exchanged.

Figure 6:
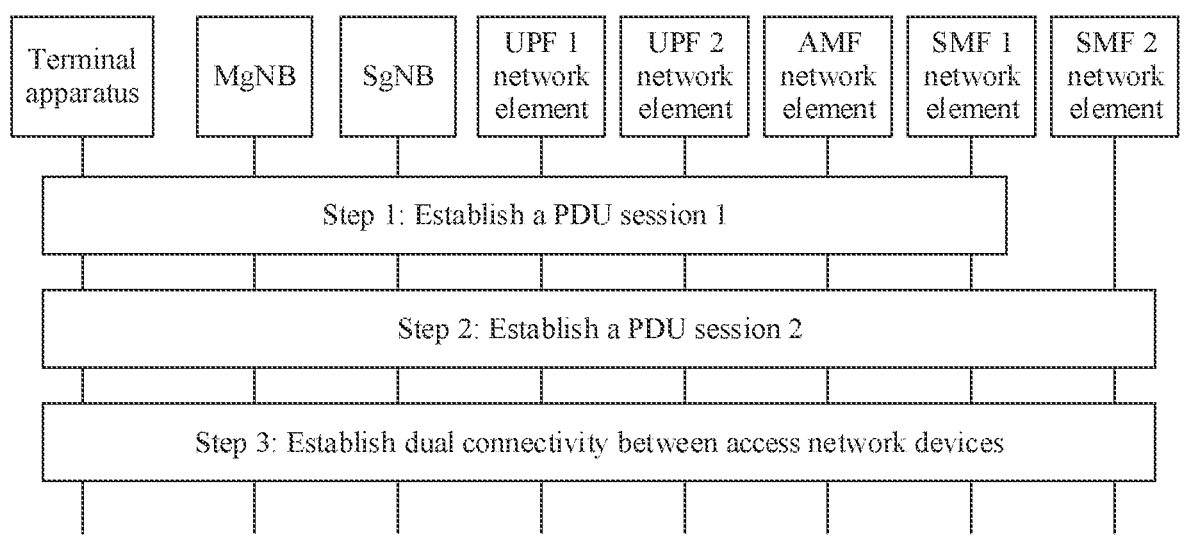
FIG. 6 is a schematic flowchart of a dual connectivity establishment method according to a related technology.

FIG. 6 shows a process of establishing a redundant PDU session based on dual connectivity. The process specifically includes the following steps.

Step 1: Establish a PDU session 1.

For example, a terminal apparatus sends a session establishment request message to a master base station. Accordingly, the master base station receives the session establishment request message from the terminal apparatus. Then, the master base station sends the session establishment request message to an AMF network element. After the AMF network element receives the session establishment request message from the master base station, the AMF network element sends the session establishment request message to an SMF 1 network element. Accordingly, the SMF 1 network element receives the session establishment request message from the AMF network element.

The SMF 1 network element selects a UPF network element based on the session establishment request message. For example, the SMF 1 network element may select an appropriate UPF network element based on a data network name (DNN) or a session and service continuity (SSC)

mode. Herein, the UPF network element selected by the SMF 1 network element is denoted as a UPF 1 network element.

The SMF 1 network element sends the session establishment request message to the UPF 1 network element. Accordingly, the UPF 1 network element receives the session establishment request message from the SMF 1 network element. After session establishment is completed, the UPF 1 network element sends a session establishment response message to the SMF 1 network element. The SMF 1 network element receives the session establishment response message from the UPF 1 network element. The session establishment response message may include a tunnel identifier on a side of the UPF 1 network element, an address of the UPF 1 network element, and the like. The SMF 1 sends the session establishment response message to the AMF network element. Accordingly, the AMF network element receives the session establishment response message from the SMF 1 network element. The AMF network element sends the session establishment response message to the master base station. The master base station sends the session establishment response message to the terminal apparatus.

Step 2: Establish a PDU session 2.

For example, the terminal apparatus sends a session establishment request message to the master base station. Accordingly, the master base station receives the session establishment request message from the terminal apparatus. Then, the master base station sends the session establishment request message to the AMF network element. After the AMF network element receives the session establishment request message from the master base station, the AMF network element sends the session establishment request message to an SMF 2 network element. Accordingly, the SMF 2 network element receives the session establishment request message from the AMF network element.

The SMF 2 network element selects a UPF network element based on the session establishment request message. The UPF network element selected by the SMF 2 network element is denoted as a UPF 2 network element. The SMF 2 network element sends the session establishment request message to the UPF 2 network element. Accordingly, the UPF 2 network element receives the session establishment request message from the SMF 2 network element. After session establishment is completed, the UPF 2 network element sends a session establishment response message to the SMF 2 network element. The SMF 2 network element receives the session establishment response message from the UPF 2 network element. The session establishment response message may include a tunnel identifier on a side of the UPF 2 network element, an address of the UPF 2 network element, and the like. The SMF 2 network element sends the session establishment response message to the AMF network element. Accordingly, the AMF network element receives the session establishment response message from the SMF 2 network element. The AMF network element sends the session establishment response message to the master base station. The master base station sends the session establishment response message to the terminal apparatus.

Step 3: Establish dual connectivity between access network devices.

The master base station sends a secondary network node addition request (secondary network addition request) to a secondary base station. Accordingly, after the secondary base station receives the secondary network node addition request from the master base station, the secondary base station sends a secondary network node addition acknowledgment (secondary network addition request ACK) to the master base station. Radio resource control (RRC) connection reconfiguration (reconfig) is performed between the secondary base station and the terminal apparatus. In this way, one terminal apparatus can access a core network device via two base stations, to establish a redundant PDU session based on dual connectivity.

In a communication system in a conventional industrial Ethernet, a redundancy transmission mechanism is implemented through two wired links. When a wireless network is used to be connected to the industrial Ethernet, if the foregoing dual-connectivity redundancy mechanism is used, a dual-connectivity network architecture needs to be adapted, resulting in limited scenarios and complex implementation.

Figure 7:
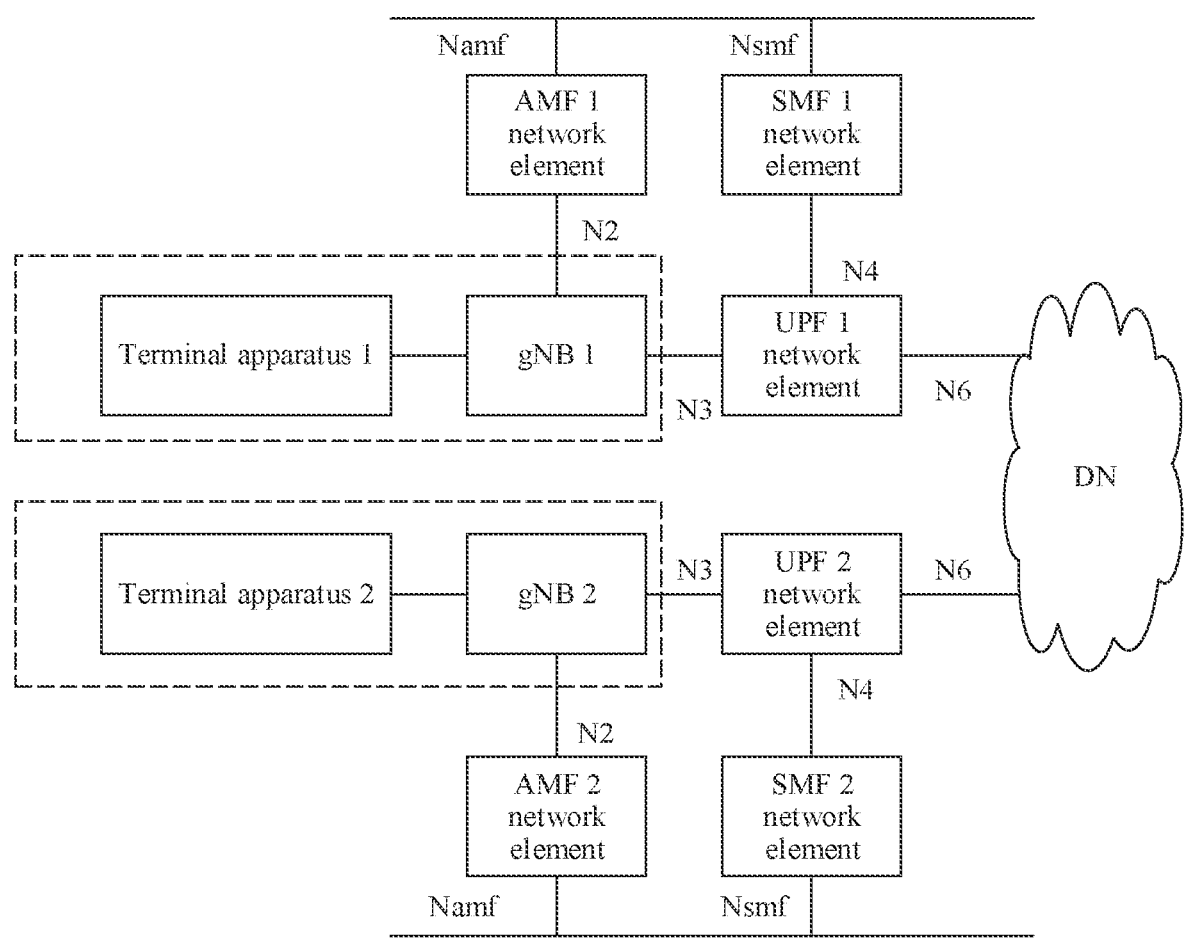
FIG. 7 is a diagram of still another network architecture according to a related technology.

In another possible design, for a device integrated with a plurality of terminal apparatuses, for example, a mobile phone having a dual subscriber identity module (SIM), a reliability group (RG) is introduced. Terminal apparatuses in different reliability groups are connected to different access network devices. For the device integrated with a plurality of terminal apparatuses, data transmission is performed via different access network devices, to reduce an error rate of data transmission. For example, refer to FIG. 7. One device is integrated with two terminal apparatuses, which are respectively a terminal apparatus 1 and a terminal apparatus 2. A reliability group to which the terminal apparatus 1 belongs is denoted as a reliability group A, and a reliability group to which the terminal apparatus 2 belongs is denoted as a reliability group B. The terminal apparatus 1 exchanges data with a data network (DN) via a gNB 1 and a UPF 1 network element, and the terminal apparatus 2 exchanges data with the DN via a gNB 2 and a UPF 2 network element. An AMF 1 network element is connected to the gNB 1 through an N2 interface, and an SMF 1 network element is connected to the UPF 1 network element through an N4 interface. An AMF 2 network element is connected to the gNB 2 through the N2 interface, and an SMF 2 network element is connected to the UPF 2 network element through the N4 interface.

In a system architecture in which a reliability group is introduced, different terminal apparatuses correspond to different core network devices and access network devices. However, in a communication system in an industrial Ethernet, it is not required that the terminal apparatus is in one-to-one correspondence with both the core network device and the access network device. In addition, in the system architecture in which a reliability group is introduced, an access network device transmits information to a terminal apparatus corresponding to the access network device, and transmission resource overheads are high.

Figure 8:
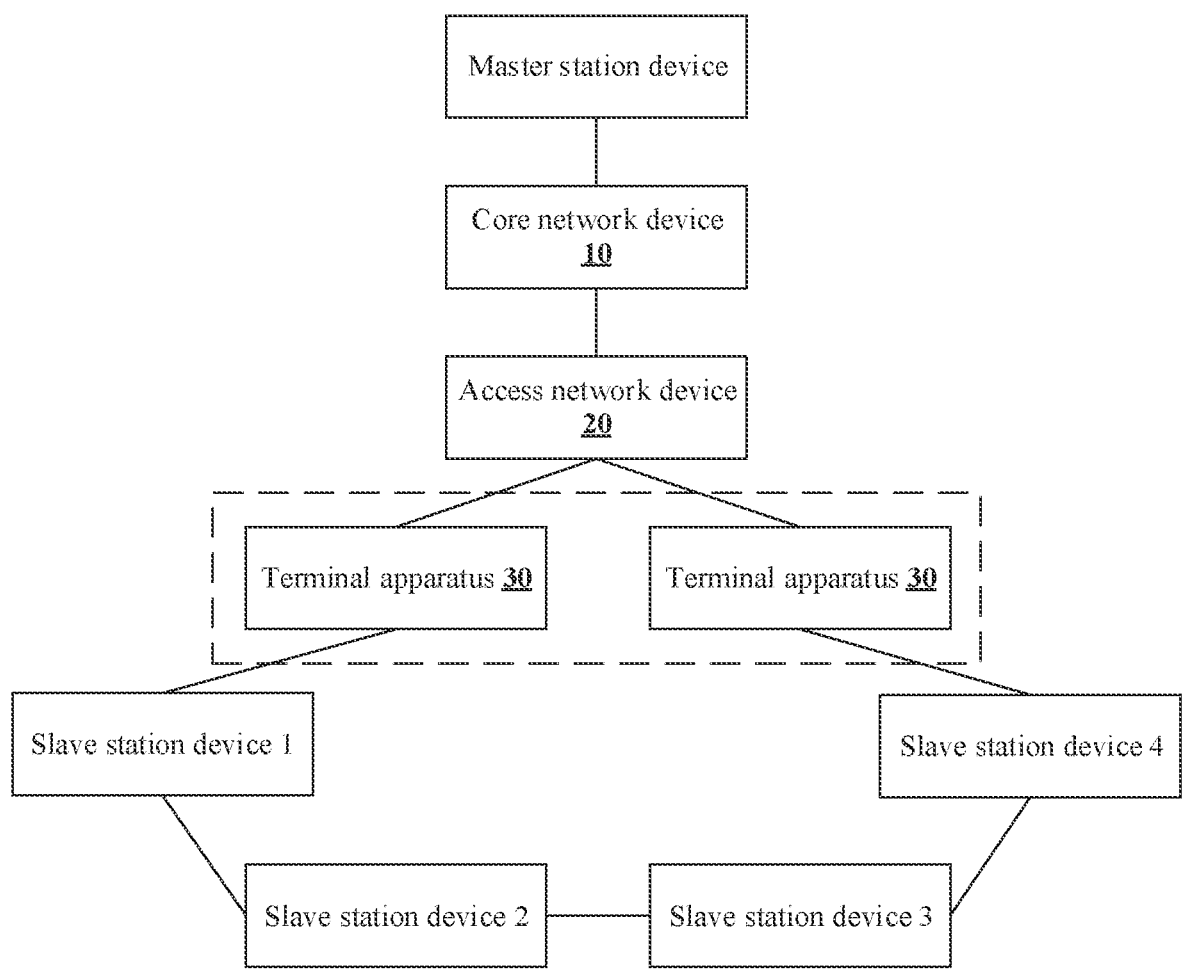
FIG. 8 is a schematic diagram of application of a wireless communication network to an industrial Ethernet according to an embodiment of this application.

In view of this, FIG. 8 is a schematic diagram of application of a wireless communication network to an industrial Ethernet according to an embodiment of this application. As shown in FIG. 8, a terminal apparatus 30 accesses a wireless communication network through a wireless interface (for example, an air interface), to communicate with another device, for example, a master station device, by using the wireless communication network. The wireless communication network includes a (radio) access network device 20 and a core network device 10. The access network device 20 is configured to connect the terminal apparatus 30 to the wireless communication network, and the core network device 10 is configured to manage the terminal apparatus 30 and provide a gateway for communicating with the another device. The terminal apparatus 30 may be a device with a wireless communication function. The terminal apparatus 30 may be connected to a slave station device in the foregoing industrial Ethernet by using an adapter, to receive, by using the wireless communication network, data sent by the master station device to the slave station device, and send the data to the slave station device; or send, to the master station device by using the wireless communication network, data sent by the slave station device to the master station device. The terminal apparatus 30 and one of a plurality of slave station devices may be integrated into one physical entity. For example, an element (for example, a chip) with the wireless communication function may be integrated into the slave station device. In this case, the slave station device is integrated with the wireless communication function and a function of performing operations according to instructions.

In the foregoing industrial Ethernet, the wireless communication network is used to replace a wired connection between the master station device and the slave station device, and communication connection is performed between the master station device and the core network device 10 in the wireless communication network. Refer to FIG. 8. There are two terminal apparatuses. A first terminal apparatus and a second terminal apparatus may be integrated into one device (specifically, as shown in a dashed-line box in FIG. 8), or may be two independent devices. The first terminal apparatus is connected to one slave station device (for example, a slave station device 1) of a plurality of slave station devices. The slave station devices are still connected to each other in a wired manner. The second terminal apparatus is connected to another slave station device (for example, a slave station device 4) of the plurality of slave station devices. A ring network topology structure is constituted by the access network device 20 and the slave station device together with two terminal apparatuses 30, specifically, as shown in FIG. 8. In addition, there may alternatively be one slave station device. In other words, both the first terminal apparatus and the second terminal apparatus are connected to the slave station device.

The terminal apparatus 30 is also referred to as a terminal or user equipment (UE), is an apparatus with the wireless communication function, and may be connected to the slave station device. The terminal apparatus 30 is referred to as a terminal apparatus in the following embodiments. The terminal apparatus 30 may be disposed independently. Alternatively, the terminal apparatus 30 may be integrated with the slave station device. In this case, the terminal apparatus 30 may be referred to as an apparatus, for example, a chip or a system on chip, that is integrated with the wireless communication function and that is in a physical entity integrated with the terminal apparatus 30 and the slave station device. The terminal apparatus 30 may include a wireless terminal in industrial control, or may be a terminal having a similar requirement in another control system, for example, a wireless terminal in self-driving, a wireless terminal in remote surgery (remote medical surgery), a wireless terminal in a smart grid, a wireless terminal in transportation safety, a wireless terminal in a smart city, or a wireless terminal in a smart home.

The access network device 20 is a device in the wireless communication network, for example, is a radio access network (RAN) node that connects the terminal apparatus 30 to the wireless communication network. Currently, some examples of the RAN node are, a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP).

In a network structure, the access network device 20 may include a centralized unit (CU) node or a distributed unit (DU) node, or include the CU node and the DU node. Optionally, a control plane (CP) and a user plane (UP) of the CU node may further be separated, and implemented by dividing into different entities, which are respectively a control plane-CU entity (CU-CP entity) and a user plane-CU entity (CU-UP entity). In a network architecture, the access network device 20 includes a baseband apparatus and a radio frequency apparatus. The baseband apparatus may be implemented by one node, or may be implemented by a plurality of nodes. The radio frequency apparatus may be remotely and independently implemented by the baseband apparatus. For example, a remote radio unit (RRU) is remotely disposed from a BBU, or may be integrated into the baseband apparatus, or some remote parts are integrated into the baseband apparatus.

Communication between the access network device 20 and the terminal apparatus 30 complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include the functions of the protocol layers such as the PDCP layer, the RLC layer, the MAC layer, and the physical layer. In an implementation, a service data adaptation (SDAP) layer may be further included above the PDCP layer. The functions of these protocol layers may be implemented by one node, or may be implemented by a plurality of nodes.

For example, when the access network device 20 includes the CU node and the DU node, a plurality of DU nodes may be controlled by one CU node in a centralized manner. The CU node and the DU node may be divided based on a protocol layer of a wireless network. For example, functions of the PDCP layer and a protocol layer above the PDCP layer are set on the CU node, and functions of protocol layers below the PDCP layer, such as the RLC layer and the MAC layer, are set on the DU node. Division based on the protocol layer is merely an example, and division may alternatively be performed based on another protocol layer. For example, division is performed based on the RLC layer. Functions of the RLC layer and a protocol layer above the RLC layer are set on the CU node, and a function of a protocol layer below the RLC layer is set on the DU node. Alternatively, division is performed based on a protocol layer. For example, a part of functions of the RLC layer and a function of a protocol layer above the RLC layer are set on the CU node, and a remaining function of the RLC layer and a function of a protocol layer below the RLC layer are set on the DU node. In addition, division may alternatively be performed in another manner. For example, the division is performed based on a latency. A function whose processing time needs to satisfy a latency requirement is set on the DU node, and a function whose processing time does not need to satisfy the latency requirement is set on the CU node.

In the foregoing network architecture, signaling generated by the CU node may be sent to the terminal apparatus 30 through the DU node, or signaling generated by the terminal apparatus 30 may be sent to the CU node through the DU node. The DU node may transparently transmit the signaling to the terminal apparatus 30 or the CU node by directly encapsulating the signaling at a protocol layer without parsing the signaling. In the following embodiments, if transmission of such signaling between the DU node and the terminal apparatus 30 is involved, that the DU node sends or receives the signaling includes this scenario. For example, signaling at the RRC layer or the PDCP layer is finally processed as signaling at the physical (PHY) layer and is sent to the terminal apparatus 30, or is converted from received signaling at the PHY layer. In the architecture, the signaling at the RRC layer or the PDCP layer may further be considered to be sent by the DU node, or sent by the DU node and a radio frequency.

An apparatus in the following embodiments of this application may be located in different devices based on functions implemented by the apparatus.

After the wireless network is introduced into the industrial Ethernet, data between the master station device and the slave station device is transmitted by using the wireless communication network. Considering that the industrial Ethernet has a high requirement on data transmission reliability, embodiments of this application provide a communication method, so that the communication method is more suitable for the requirement of the industrial Ethernet, and data transmission is more reliable.

The communication system and the service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as a network architecture evolves and a new service scenario emerges.

The following describes in detail the communication method provided in embodiments of this application.

It should be noted that in the following embodiments of this application, names of messages between network elements, names of parameters in messages, or the like are merely examples, and may be other names during specific implementation. This is uniformly described herein, and details are not described below again.

Figure 9:
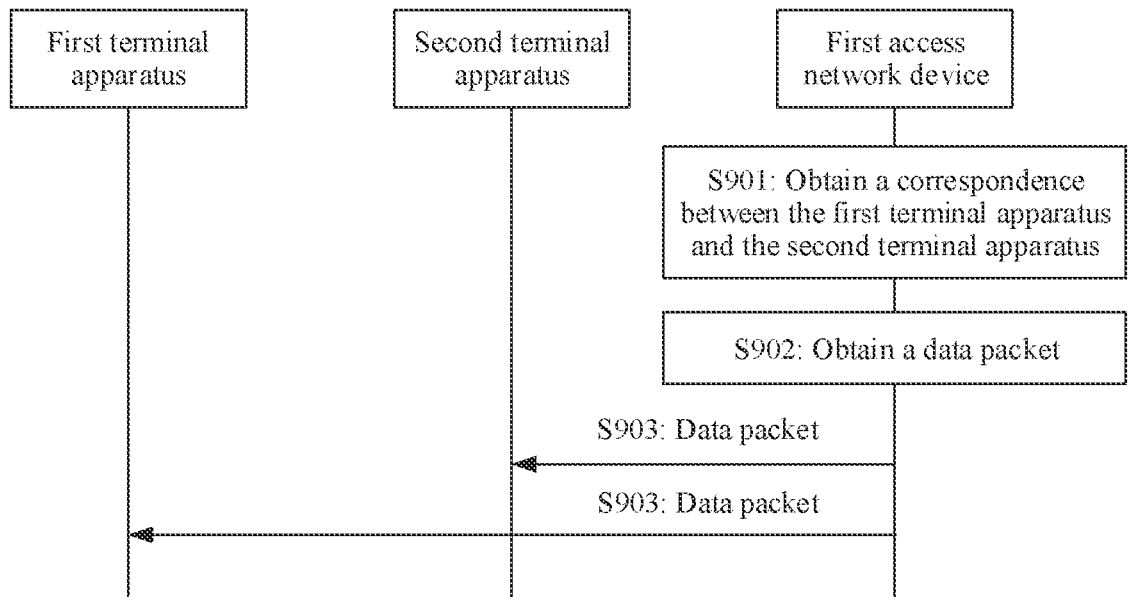
FIG. 9 is a schematic flowchart of a communication method according to an embodiment of this application.

An embodiment of this application provides a communication method, and the communication method is applied to a process of data transmission in an industrial Ethernet. Refer to FIG. 9. The communication method includes the following steps.

S901: A first access network device obtains a correspondence between a first terminal apparatus and a second terminal apparatus.

The first terminal apparatus and the second terminal apparatus are two terminal apparatuses in a same ring network topology structure, and the two terminal apparatuses can transmit data for a same slave station device group. The slave station device group includes at least one slave station device. With reference to FIG. 8, the slave station device group includes slave station devices 1 to 4, and the first terminal apparatus and the second terminal apparatus transmit data for the slave station device group, to form two mutually redundant (or backup) transmission paths. On the $1^{st}$ path, a data packet from a master station device arrives at the slave station device 1 via the first terminal apparatus, arrives at the slave station device 4 via the slave station device 2 and the slave station device 3, and is returned to the master station device via the second terminal apparatus. On the $2^{nd}$ path, the data packet from the master station device arrives at the slave station device 4 via the second terminal apparatus, arrives at the slave station device 1 via the slave station device 3 and the slave station device 2, and is returned to the master station device via the first terminal apparatus. When the data packet passes through each slave station device, content of the data packet may change, and the slave station device reads data of the slave station device and/or writes data of the slave station device into the data packet. When the slave station device group includes only one slave station device, the first terminal apparatus and the second terminal apparatus are connected to a same slave station device.

The correspondence between the first terminal apparatus and the second terminal apparatus is for indicating that the first terminal apparatus and the second terminal apparatus are in a mutual redundancy relationship; the first terminal apparatus and the second terminal apparatus provide a wireless interface to the slave station device for a same master station device; the first terminal apparatus and the second terminal apparatus provide a wireless network interface for a same slave station device group; or the first terminal apparatus and the second terminal apparatus provide a wireless interface for a same industrial network area. In this way, the data packet sent by the master station device to the slave station device group may be transmitted to the slave station device group via the first terminal apparatus, and the slave station device in the slave station device group reads, from the data packet, data sent by the master station device to the slave station device, and writes data to be sent to the master station device into the data packet. Then, the data packet is transmitted to a wireless network via the second terminal apparatus, and returned the data to the master station device by using the wireless network. Similarly, the data packet sent by the master station device to the slave station device group may be transmitted to the slave station device group via the second terminal apparatus, and the slave station device in the slave station device group reads, from the data packet, data sent by the master station device to the slave station device, and writes data to be sent to the master station device into the data packet. Then, the data packet is transmitted to the wireless network via the first terminal apparatus, and returned to the master station device by using the wireless network.

The data packet is, for example, an Ethernet frame. The Ethernet frame includes data sent by the master station device to at least one slave station device. When the Ethernet frame passes through each slave station device, the slave station device reads data of the slave station device from the Ethernet frame, and writes data to be sent to the master station device into the Ethernet frame. The Ethernet frame is transmitted to the wireless network via a terminal apparatus, and finally returned to the master station device. In a process in which the Ethernet frame is sent from the master station device and returned to the master station device, although this process is for a same Ethernet frame, data in the Ethernet frame is different.

S902: The first access network device obtains a data packet.

The data packet is obtained by the first access network device from a core network device (for example, a UPF), and is a data packet exchanged between the master station device and the slave station device. Herein, the data packet exchanged between the master station device and the slave station device comply with an industrial Ethernet protocol, for example, EtherNet/IP, PROFINET, EtherCAT, Powerlink, or Modbus-TCP (Transmission Control Protocol). "Exchange" in this embodiment of this application may be replaced with "transmission". For a data packet in a direction from the master station device to the slave station device, the exchange is transmission from the master station device to the slave station device. For a data packet in a direction from the slave station device to the master station device, the exchange is transmission from the slave station device to the master station device.

Optionally, the data packet includes type indication information. The type indication information indicates a type of the data packet, for example, an Ethernet data packet or a wireless network data packet. The Ethernet data packet is data transmitted between the master station device and the slave station device. The Ethernet data packet is encapsulated into a data packet that satisfies a wireless network transmission protocol, and is transmitted in the wireless network. The Ethernet data packet is distinguished from a conventional wireless network data packet based on the type indication information. The wireless network data packet is a data packet exchanged between the terminal apparatus and the access network device.

Specifically, the type indication information may be but not limited to the following two examples.

Example 1: The type indication information is indication information of the industrial Ethernet protocol complied by the data packet. For example, an index is pre-configured for the industrial Ethernet protocol. For example, indexes of the industrial Ethernet protocols EtherNet/IP, PROFINET, EtherCAT, Powerlink, and Modbus-TCP are sequentially 1, 2, 3, 4, and 5, or may not be in sequence, for example, 1, 2, 3, 5, and 6. In this case, the type indication information includes the index of the industrial Ethernet protocol. In this way, the type indication information can indicate that the data packet is data exchanged between the master station device and the slave station device, and also indicate a type of the industrial Ethernet protocol complied by the data packet.

Example 2: The type indication information is indication information of quality of service of the data packet. For example, the type indication information is a parameter for identifying a transmission characteristic of the data packet, for example, a quality of service class identifier (QCI). Herein, a QCI corresponding to the industrial Ethernet protocol is different from a QCI corresponding to another protocol (for example, a wireless communication network protocol).

Specifically, the type indication information occupies a preset quantity of bits. A value of the preset quantity is any positive integer, for example, 2, 3, 4, 5, 6, or 7.

Specifically, the type indication information is carried in different types of messages, which may be but not limited to the following two examples.

Example 1: The type indication information is carried in a MAC subheader, and the MAC subheader includes a bit and an LCID. The bit is for indicating that the data packet is data transmitted between the master station device and the slave station device, and the bit may be a reserved bit R. Alternatively, the LCID has a preset value, and the preset value is for indicating that the data packet is data transmitted between the master station device and the slave station device. The preset value may be any positive integer ranging from 33 to 51.

Example 2: The type indication information is carried in a MAC SDU. For example, the type indication information is a sequence number in the MAC SDU, the sequence number is a preset value, and the preset value is for indicating that the data packet is data transmitted between the master station device and the slave station device. Alternatively, the MAC SDU includes other indication information that has a same function.

In this way, after the terminal apparatus receives the data packet, if the data packet carries the type indication information, the terminal apparatus can learn that the data packet is data transmitted between the master station device and the slave station device, and then send the data packet to the slave station device; if the data packet does not carry the type indication information, the terminal apparatus can learn that the data packet is data sent by the first access network device to the terminal apparatus, and does not need to send the data packet to the slave station device.

When the terminal apparatus is dedicated to an interface between the industrial Ethernet and the wireless network, the type indication information may not exist. Alternatively, a dedicated terminal apparatus identifier may be allocated to a terminal apparatus used in the industrial Ethernet, and information for scheduling data packet transmission is scrambled by using the terminal apparatus identifier, so that a common terminal apparatus in the wireless network can be distinguished. In this case, the type indication information may not exist.

S903: The first access network device sends the data packet to the first terminal apparatus and the second terminal apparatus based on the correspondence. Accordingly, the first terminal apparatus and the second terminal apparatus receive the data packet from the first access network device. The first access network device sends the same data packet to the first terminal apparatus and the second terminal apparatus.

The correspondence is the foregoing "correspondence between the first terminal apparatus and the second terminal apparatus".

For the first terminal apparatus, after the first terminal apparatus receives the data packet, if the data packet does not include the type indication information, in other words, if the data packet is a data packet exchanged between the first access network device and the first terminal apparatus, the first terminal apparatus does not need to forward the data packet to the slave station device. If the data packet includes the type indication information, in other words, if the data packet is a data packet exchanged between the master station device and the slave station device, the first terminal apparatus forwards the data packet to the slave station device. In this case, the data packet sent by the first access network device to the first terminal apparatus is transmitted along a second path. The second path is from the first terminal apparatus to the second terminal apparatus via the at least one slave station device.

For the second terminal apparatus, after the second terminal apparatus receives the data packet, if the data packet does not include the type indication information, in other words, if the data packet is a data packet exchanged between the first access network device and the second terminal apparatus, the second terminal apparatus does not need to forward the data packet to the slave station device. If the data packet includes the type indication information, in other words, if the data packet is a data packet exchanged between the master station device and the slave station device, the second terminal apparatus forwards the data packet to the slave station device. In this case, the data packet sent by the first access network device to the second terminal apparatus is transmitted along a first path. The first path is from the second terminal apparatus to the first terminal apparatus via the at least one slave station device.

When the data packet passes through each slave station device, the slave station device may read data sent by the master station device to the slave station device, and write data to be sent to the master station device into the data packet. The data to be sent by the slave station device to the master station device may be an acknowledgment (ACK) or a negative acknowledgment (NACK) fed back by the slave station device for the data packet delivered by the master station device, or may be data newly generated by the slave station device. Because data packets sent by the first access network device to the two terminal apparatuses are the same, and the same data packets are processed by a same slave station device, the data packets finally returned by the two terminal apparatuses to the first access network device are the same. In this way, data redundancy transmission is implemented, and data transmission reliability is improved. In addition, a data redundancy transmission mechanism using a wireless network is implemented via the two terminal apparatuses.

It should be noted that in this embodiment of this application, a sequence of performing S901 and S902 is not limited. To be specific, the first access network device may perform S901 before S902, may perform S902 before S901, or may simultaneously perform S901 and S902.

Optionally, a specific implementation process of S901 may be but not limited to the following three manners:

Manner 1: The first access network device obtains "the correspondence between the first terminal apparatus and the second terminal apparatus" from the terminal apparatus.

In an industrial network, terminal apparatuses serving a same slave station device group may be preset, so that an identifier of the second terminal apparatus is stored in the first terminal apparatus in advance, and/or an identifier of the first terminal apparatus may be stored in the second terminal apparatus. Then, the first terminal apparatus and/or the second terminal apparatus send/sends the correspondence between the first terminal apparatus and the second terminal apparatus to the first access network device. For example, the first terminal apparatus or the second terminal apparatus sends the correspondence between the first terminal apparatus and the second terminal apparatus (for example, the identifier of the first terminal apparatus and the identifier of the second terminal apparatus) to the first access network device. The first terminal apparatus is used as an example. The first terminal apparatus sends the identifier of the first terminal apparatus and the identifier of the second terminal apparatus to the first access network device; or the first terminal apparatus sends the identifier of the second terminal apparatus to the first access network device, and a message carrying the identifier of the second terminal apparatus is scrambled by using the identifier of the first terminal apparatus. This embodiment is not limited thereto, provided that the first access network device can learn of the correspondence between the first terminal apparatus and the second terminal apparatus.

For another example, the first terminal apparatus sends the identifier of the second terminal apparatus to the first access network device, and the second terminal apparatus sends the identifier of the first terminal apparatus to the first access network device. In this way, the first access network device can obtain the correspondence between the two terminal apparatuses.

The identifier of the terminal apparatus may be but not limited to a cell radio network temporary identifier (C-RNTI), an international mobile subscriber identity (IMSI), a globally unique temporary identifier (GUTI), a subscriber identity module (SIM) identifier, address information (for example, an internet protocol (IP) address or a medium access control (MAC) address) identifying the terminal apparatus, or a system architecture evolved-temporary mobile subscriber identity (SAE-TMSI) allocated by the core network device to the terminal apparatus. Herein, the SAE-TMSI may be referred to as an S-TMSI (serving-TMSI) for short. A temporary identifier (for example, the C-RNTI, the GUTI, or the S-TMSI) allocated by a network side to the terminal apparatus is not stored in the terminal apparatus in advance, but may be used to scramble a message sent by the terminal apparatus to an access network device, or is used as an identifier reported by the terminal apparatus after the terminal apparatus accesses a network.

In this way, when the first terminal apparatus and/or the second terminal apparatus obtain/obtains the correspondence between the two terminal apparatuses, the first access network device can obtain the correspondence between the two terminal apparatuses from the first terminal apparatus and/or the second terminal apparatus.

Figure 10:
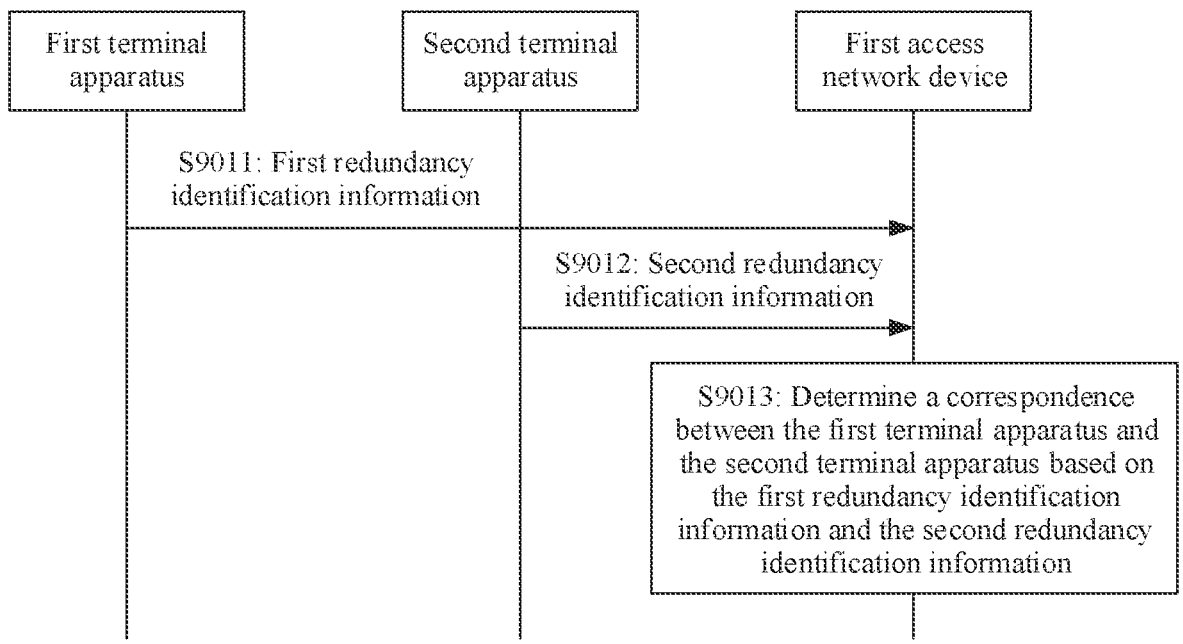
FIG. 10 is a schematic flowchart of another communication method according to an embodiment of this application.

Manner 2: The first access network device obtains redundancy identification information from the terminal apparatus, and further determines "the correspondence between the first terminal apparatus and the second terminal apparatus". For example, refer to FIG. 10. A specific implementation process of S901 includes S9011, S9012, and S9013.

S9011: The first terminal apparatus sends first redundancy identification information to the first access network device. Accordingly, the first access network device receives the first redundancy identification information from the first terminal apparatus.

The first redundancy identification information includes at least one of the following information: an identifier of a master station device, an identifier of at least one slave station device, an identifier of a slave station device list, and an identifier of a terminal apparatus. For example, the identifier of the master station device may include a MAC address of the master station device. The identifier of the at least one slave station device includes an identifier of one slave station device (for example, a slave station device connected to the first terminal apparatus or a slave station device connected to the second terminal apparatus), or includes identifiers of a plurality of slave station devices (for example, slave station devices between the first terminal apparatus and the second terminal apparatus in the ring network topology structure). Herein, the slave station device list includes at least one slave station device (or an identifier of the slave station device). The identifier of the slave station device list is described as a slave station device list identifier. For example, if the first redundancy identification information includes an identifier of a terminal apparatus, the first redundancy identification information may include identifiers of two terminal apparatuses (the first terminal apparatus and the second terminal apparatus). Alternatively, the first redundancy identification information may include an identifier of one terminal apparatus (for example, the first terminal apparatus or the second terminal apparatus) and an identifier of a master station device, include an identifier of one terminal apparatus (for example, the first terminal apparatus or the second terminal apparatus) and an identifier of at least one slave station device, or include an identifier of one terminal apparatus (for example, the first terminal apparatus or the second terminal apparatus) and an identifier of a slave station device list.

S9012: The second terminal apparatus sends second redundancy identification information to the first access network device. Accordingly, the first access network device receives the second redundancy identification information from the second terminal apparatus.

The second redundancy identification information includes at least one of the following information: an identifier of a master station device, an identifier of at least one slave station device, an identifier of a slave station device list, and an identifier of a terminal apparatus. The identifier of the terminal apparatus includes the identifier of the first terminal apparatus and/or the identifier of the second terminal apparatus. Herein, the slave station device list includes an identifier of at least one slave station device. The identifier of the slave station device list is described as a slave station device list identifier.

For example, if the second redundancy identification information includes an identifier of a terminal apparatus, the second redundancy identification information may include identifiers of two terminal apparatuses (the first terminal apparatus and the second terminal apparatus). The second redundancy identification information may further include an identifier of one terminal apparatus (for example, the first terminal apparatus or the second terminal apparatus) and an identifier of a master station device, include an identifier of one terminal apparatus (for example, the first terminal apparatus or the second terminal apparatus) and an identifier of at least one slave station device, or include an identifier of one terminal apparatus (for example, the first terminal apparatus or the second terminal apparatus) and an identifier of a slave station device list.

The first redundancy identification information may be carried in an RRC message or a MAC control element (CE). The second redundancy identification information may also be carried in the RRC message or the MAC control element (CE).

It should be noted that in this embodiment of this application, a sequence of performing S9011 and S9012 is not limited. To be specific, the first access network device may perform S9011 before S9012, may perform S9012 before S9011, or may simultaneously perform S9011 and S9012.

S9013: The first access network device determines the correspondence between the first terminal apparatus and the second terminal apparatus based on the first redundancy identification information and the second redundancy identification information.

A first redundancy identifier and a second redundancy identifier each may carry identification information for identifying an industrial network area. When the first redundancy identifier and the second redundancy identifier both carry identification information representing a same industrial network area, there is a correspondence between the first terminal apparatus and the second terminal apparatus. The identification information of the industrial network area may include, for example, an identifier of a master station device, an identifier of a slave station device, or an identifier of a slave station device list. Certainly, a plurality of the foregoing identifiers may alternatively be selected to identify the industrial network area. This is not limited in this application. Optionally, an identifier of a terminal apparatus may alternatively be used to identify the industrial network area.

For example, if the first redundancy identification information and the second redundancy identification information both include an identifier of a same master station device, include an identifier of a same slave station device, include an identifier of a same slave station device list, or include an identifier of a same terminal apparatus, the first access network device determines that the first terminal apparatus and the second terminal apparatus are in a mutual redundancy relationship, namely, the correspondence between the first terminal apparatus and the second terminal apparatus.

In this case, the first access network device may determine the first terminal apparatus and the second terminal apparatus based on sources of the first redundancy identification information and the second redundancy identification information. For example, a message carrying the first redundancy identification information and a message carrying the second redundancy identification information are respectively scrambled by using the identifier of the first terminal apparatus and the identifier of the second terminal apparatus. Optionally, the first redundancy identification information and the second redundancy identification information each may further include an identifier of a terminal apparatus. In this way, the first access network device may determine the correspondence based on the identifier of the terminal apparatus in the first redundancy identification information and the identifier of the terminal apparatus in the second redundancy identification information. For example, the first redundancy identification information includes the identifier of the first terminal apparatus (or the identifier of the second terminal apparatus), the second redundancy identification information includes the identifier of the second terminal apparatus (or the identifier of the first terminal apparatus). The first redundancy identifier and the second redundancy identifier both carry identification information representing a same industrial network area, and the first access network device determines that there is a correspondence between the first terminal apparatus represented by the identifier of the first terminal apparatus and the second terminal apparatus represented by the identifier of the second terminal apparatus.

In addition, if the first redundancy identification information includes an identifier of one terminal apparatus and an identifier of a master station device, and the second redundancy identification information includes an identifier of one terminal apparatus and an identifier of at least one slave station device, the first access network device determines the correspondence between the first terminal apparatus and the second terminal apparatus based on a subordination relationship between the identifier of the master station device and the identifier of the slave station device.

The first redundancy identifier and the second redundancy identifier each may carry an identifier of a terminal apparatus. The first redundancy identifier carries the identifier of the second terminal apparatus, and the second redundancy identifier carries the identifier of the first terminal apparatus. In this case, the first access network device determines, based on the identifier of the second terminal apparatus and the identifier of the first terminal apparatus, that there is a correspondence between the first terminal apparatus and the second terminal apparatus.

In this way, after the first access network device receives the redundancy identification information from the two terminal apparatuses, the first access network device determines the correspondence between the two terminal apparatuses based on the redundancy identification information from the two terminal apparatuses.

Figure 11:
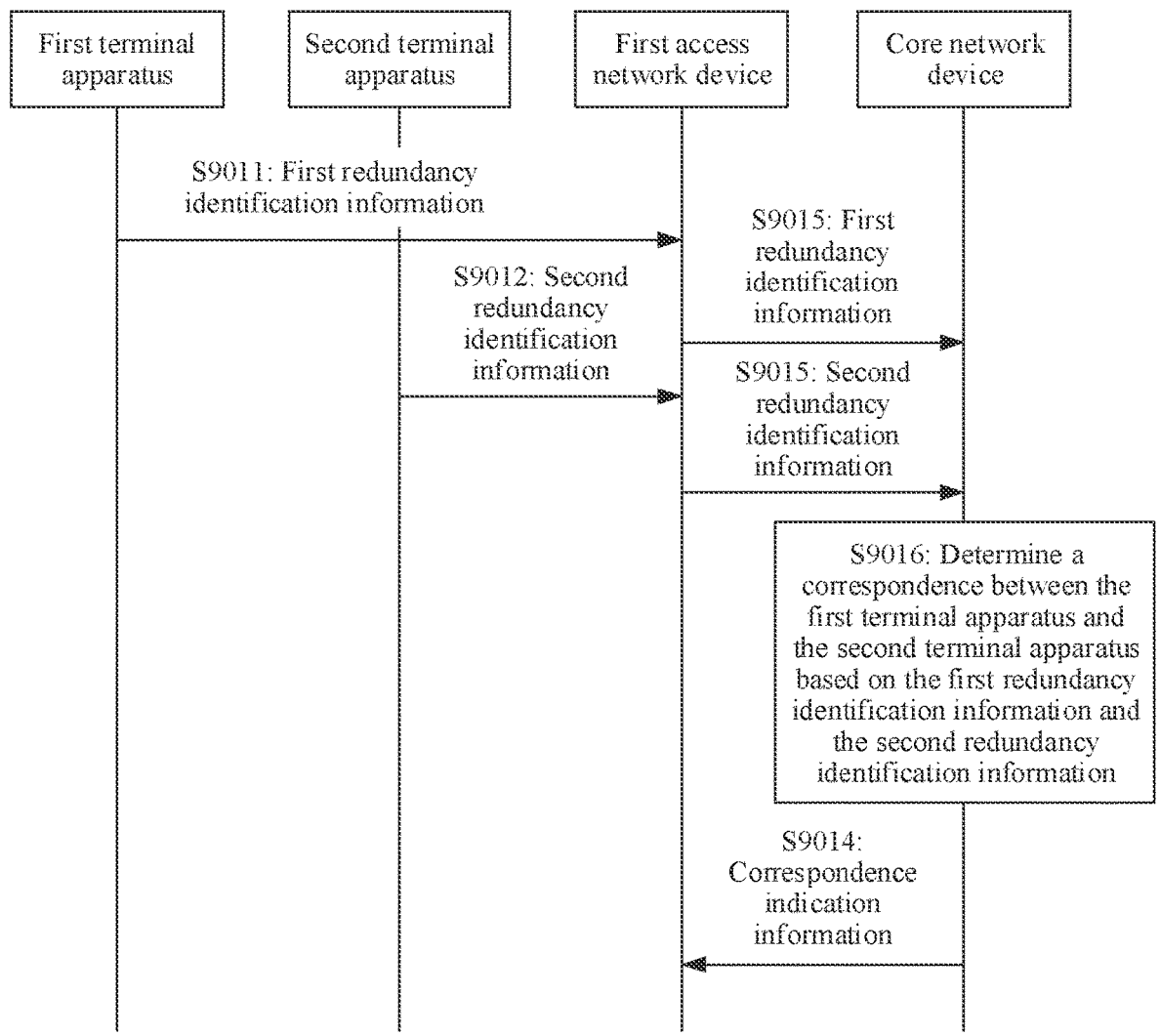
FIG. 11 is a schematic flowchart of still another communication method according to an embodiment of this application.

Manner 3: The first access network device obtains "the correspondence between the first terminal apparatus and the second terminal apparatus" from the core network device (for example, the UPF). Refer to FIG. 11. A specific implementation process of S901 includes S9014.

S9014: The core network device sends correspondence indication information to the first access network device. Accordingly, the first access network device receives the correspondence indication information from the core network device.

The correspondence indication information indicates the correspondence between the first terminal apparatus and the second terminal apparatus.

For the core network device, before performing S9014, the core network device determines the correspondence between the first terminal apparatus and the second terminal apparatus. The core network device determines the correspondence between the first terminal apparatus and the second terminal apparatus by using, for example, but not limited to the following manner:

Manner 1: The core network device determines the correspondence between the first terminal apparatus and the second terminal apparatus based on subscription information of the first terminal apparatus and subscription information of the second terminal apparatus. The subscription information of the first terminal apparatus and the subscription information of the second terminal apparatus are pre-obtained. For example, the UPF obtains the subscription information of the first terminal apparatus and the subscription information of the second terminal apparatus from a UDR (unified data repository), and further determines the correspondence between the first terminal apparatus and the second terminal apparatus.

Manner 2: The core network device obtains first redundancy identification information and second redundancy identification information from the first access network device, and determines the correspondence between the first terminal apparatus and the second terminal apparatus based on the first redundancy identification information and the second redundancy identification information. For example, refer to FIG. 11. The core network device performs S9015 and S9016.

S9015: The first access network device sends the first redundancy identification information and the second redundancy identification information to the core network device. Accordingly, the core network device receives the first redundancy identification information and the second redundancy identification information from the first access network device.

Herein, for the first access network device, after performing S9011 and S9012, the first access network device performs S9015. If the first access network device forwards the first redundancy identification information and the second redundancy identification information, and does not parse the first redundancy identification information and the second redundancy identification information, both the first redundancy identification information and the second redundancy identification information are carried in a non-access stratum (NAS) message, for example, but not limited to an attach request message or a register request message.

S9016: The core network device determines the correspondence between the first terminal apparatus and the second terminal apparatus based on the first redundancy identification information and the second redundancy identification information.

For example, if the first redundancy identification information and the second redundancy identification information both include an identifier of a same master station device, include an identifier of a same slave station device, include an identifier of a same slave station device list, or include an identifier of a same terminal apparatus, the core network device determines that the first terminal apparatus and the second terminal apparatus are in a mutual redundancy relationship, namely, the correspondence between the first terminal apparatus and the second terminal apparatus. In addition, if the first redundancy identification information includes an identifier of one terminal apparatus and an identifier of a master station device, and the second redundancy identification information includes an identifier of one terminal apparatus and an identifier of at least one slave station device, the core network device determines the correspondence between the first terminal apparatus and the second terminal apparatus based on a subordination relationship between the identifier of the master station device and the identifier of the slave station device.

In this way, the core network device can determine the correspondence between the two terminal apparatuses, to indicate the correspondence between the two terminal apparatuses to the first access network device.

Figure 12:
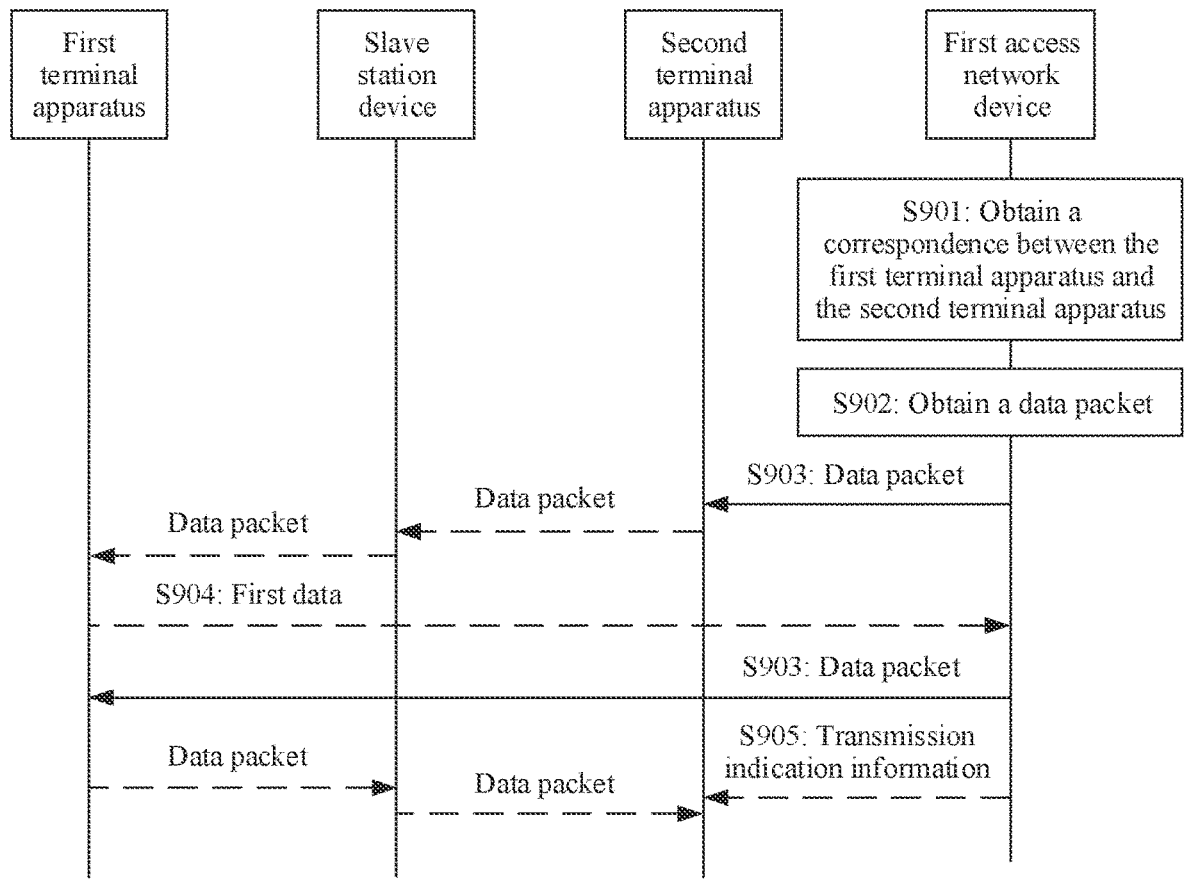
FIG. 12 is a schematic flowchart of yet another communication method according to an embodiment of this application.

After the first access network device performs S903, the data packet is transmitted between the slave station devices. Refer to FIG. 12. For the second terminal apparatus, after receiving the data packet from the first access network device, the second terminal apparatus sends the data packet to the first (or last) slave station device of a plurality of slave station devices. When the data packet passes through each slave station device, the slave station device may read data sent by the master station device to the slave station device, and write data to be sent to the master station device into the data packet. The data to be sent by the slave station device to the master station device may be an acknowledgment (ACK) or a negative acknowledgment (NACK) fed back by the slave station device for the data packet delivered by the master station device, or may be data newly generated by the slave station device. After passing through all slave station devices, the data packet is transmitted by the last (or first) slave station device of the plurality of slave station devices to the first terminal apparatus. In this application, in a scenario in which the first access network device sends a data packet to two terminal apparatuses, data obtained by transmitting the data packet along a first path (from the second terminal apparatus to the first terminal apparatus via the slave station device) is described as "first data".

Refer to FIG. 12. For the first terminal apparatus, after receiving the data packet from the first access network device, the first terminal apparatus sends the data packet to the last (or first) slave station device of a plurality of slave station devices. When the data packet passes through each slave station device, the slave station device may read data sent by the master station device to the slave station device, and write data to be sent to the master station device into the data packet. After passing through all slave station devices, the data packet is transmitted by the first (or last) slave station device of the plurality of slave station devices to the second terminal apparatus. In this application, in a scenario in which the first access network device sends a data packet to two terminal apparatuses, data obtained by transmitting the data packet along a second path (from the first terminal apparatus to the second terminal apparatus via the slave station device) is described as "second data".

Herein, the first path and the second path are redundant to each other, and the obtained first data and second data obtained by transmitting a same data packet respectively along the first path and the second path are also the same. In this way, a same data packet is transmitted along mutually redundant paths, to ensure data transmission reliability.

It should be noted that there may be three, four, or more mutually redundant transmission paths. In this embodiment of this application, that two paths are mutually redundant is merely used as an example for description.

Optionally, to distinguish between different redundant paths, different redundancy sequence numbers (RSNs) are used to identify the different redundant paths. A quantity of bits used by the RSN may be a positive integer greater than or equal to 1, and is related to a quantity of mutually redundant transmission paths. For example, if the quantity of mutually redundant paths is 2, the quantity of bits of the RSN may be 1; if the quantity of mutually redundant paths is 3, the quantity of bits of the RSN may be 2. To help the first access network device distinguish between different redundant paths, the terminal apparatus may perform the following step 1 and step 2 when transmitting the RSN to the first access network device.

Step 1: The first terminal apparatus sends a first RSN to the first access network device. Accordingly, the first access network device receives the first RSN from the first terminal apparatus.

The first RSN identifies a sequence number of a redundant path. For example, a value of the first RSN may be 1, to indicate that a redundant path corresponding to the first terminal apparatus is the $1^{st}$ redundant path serving the master station device. The value of the first RSN may alternatively be 2, to indicate that the redundant path corresponding to the first terminal apparatus is the $2^{nd}$ redundant path serving the master station device. The first RSN may be information pre-stored by the first terminal apparatus. The redundant path identified by the first RSN corresponds to the first terminal apparatus. In other words, the first access network device sends a data packet to the first terminal apparatus, so that the data packet is transmitted along the redundant path identified by the first RSN.

Step 2. The second terminal apparatus sends a second RSN to the first access network device. Accordingly, the first access network device receives the second RSN from the second terminal apparatus.

The second RSN identifies a sequence number of another redundant path. For example, when the value of the first RSN is 1, a value of the second RSN may be 2, to indicate that a redundant path corresponding to the second terminal apparatus is the $2^{nd}$ redundant path serving the master station device. When the value of the first RSN is 2, the value of the second RSN may be 1, to indicate that the redundant path corresponding to the second terminal apparatus is the 1 redundant path serving the master station device. In this way, the first access network device can distinguish between different redundant paths. Alternatively, the second RSN may be information pre-stored by the second terminal apparatus. The redundant path identified by the second RSN corresponds to the second terminal apparatus. In other words, the first access network device sends a data packet to the second terminal apparatus, so that the data packet is transmitted along the redundant path identified by the second RSN.

In this way, the first access network device can distinguish between different redundant paths based on the first RSN and the second RSN. In a process of transmitting a data packet along different redundant paths, the first access network device may send a corresponding data packet to a terminal apparatus corresponding to a redundant path, so that the data packet is transmitted along the corresponding redundant path.

It should be noted that the first RSN may be carried in the first redundancy identification information, or may be carried in other information, so that the first access network device obtains a correspondence between the redundant path identified by the first RSN and the first terminal apparatus. Similarly, the second RSN may be carried in the second redundancy identification information, or may be carried in other information, so that the first access network device obtains a correspondence between the redundant path identified by the second RSN and the second terminal apparatus.

In addition, redundant paths identified by different RSNs are different. The "first path" and the "second path" described in this embodiment of this application are two different transmission paths, and are in a mutual redundancy relationship. The first path may be a redundant path whose RSN is valued as 1, or may be a redundant path whose RSN is valued as 2. When the first path is a redundant path whose RSN is valued as 1, the second path may be a redundant path whose RSN is valued as 2. When the first path is a redundant path whose RSN is valued as 2, the second path may be a redundant path whose RSN is valued as 1.

Optionally, the terminal apparatus may have a plurality of logical channels (LCHs), and the terminal apparatus specifies one or more logical channels to be dedicated for transmitting a data packet exchanged between the master station device and the slave station device. To help the first access network device learn of a logical channel, of the terminal apparatus, which is used to transmit the received data packet, the following step 3 and step 4 may be performed.

Step 3: The first terminal apparatus sends an identifier of a first logical channel to the first access network device. Accordingly, the first access network device receives the identifier of the first logical channel from the first terminal apparatus.

The first logical channel is used to transmit the data packet exchanged between the master station device and the slave station device. In this way, the first access network device can learn of a logical channel used by the first terminal apparatus to transmit the data packet.

Step 4: The second terminal apparatus sends an identifier of a second logical channel to the first access network device. Accordingly, the first access network device receives the identifier of the second logical channel from the second terminal apparatus.

The second logical channel is used to transmit the data packet exchanged between the master station device and the slave station device. In this way, the first access network device can learn of a logical channel used by the second terminal apparatus to transmit the data packet.

It should be noted that the identifier of the first logical channel may be carried in the first redundancy identification information, or may be carried in other information. Similarly, the identifier of the second logical channel may be carried in the second redundancy identification information, or may be carried in other information.

Optionally, to save air interface resources, after S903, if the first access network device receives a data packet returned by one of the paths, the first access network device stops transmission on the other path. In other words, the first access network device indicates a terminal apparatus on the other path to stop transmitting the returned data packet to the first access network device. Specifically, that the first access network device stops scheduling an uplink resource used to receive the returned data packet may further include: stopping scheduling a retransmission resource used to retransmit the returned data packet. In other words, after performing S903, the first access network device performs S904 and S905. If the first access network device does not receive, in preset time, a data packet returned by one path, the first access network device waits to receive a data packet returned by the other path, and the first access network device does not perform S905. Refer to FIG. 12. S904 and S905 are described as follows:

S904: The first terminal apparatus sends first data to the first access network device. Accordingly, the first access network device receives the first data from the first terminal apparatus.

The first data is data obtained by transmitting the data packet along the first path. The first path is from the second terminal apparatus to the first terminal apparatus via the slave station device.

S905: The first access network device sends transmission indication information to the second terminal apparatus. Accordingly, the second terminal apparatus receives the transmission indication information from the first access network device.

The transmission indication information indicates the second terminal apparatus to stop transmitting second data to the first access network device. The second data is data obtained by transmitting the data packet along the second path. The second path is from the first terminal apparatus to the second terminal apparatus via the slave station device.

The transmission indication information is carried in a medium access control (MAC) sub protocol data unit (PDU), and the MAC subPDU includes a MAC subheader and a medium access control (MAC) control element (CE). The MAC subheader includes a logical channel identifier (LCID). The transmission indication information may be implemented by using the LCID in the MAC subheader, or may be implemented by using the MAC CE. For example, when the LCID in the MAC subheader has a preset value, the second terminal apparatus stops, based on the value of the LCID, transmitting the second data to the first access network device. Alternatively, the LCID indicates that a MAC CE corresponding to the MAC subheader in which the LCID is located is a MAC CE used to indicate the second terminal apparatus to stop transmitting the second data to the first access network device. In other words, the MAC CE includes the transmission indication information (is the transmission indication information or carries the transmission indication information). For example, the LCID indicates a type of the MAC CE. Values of the LCID are different, and types of MAC CEs indicated by the values of the LCID are also different. Precision of indicating, by different types of MAC CEs, the second data whose transmission stops is different, and the types of MAC CEs include, but not limited to, the following types:

First-type MAC CE: A length of this type of MAC CE is a preset length, and this type of MAC CE is for indicating the second terminal apparatus to stop transmitting the second data to the first access network device. The preset length may be one byte, two bytes, or another quantity of bytes. In an implementation, a preset length of the MAC CE is 0, that is, a bearer of a MAC subPDU is 0. A value of an LCID in a MAC subheader corresponding to the MAC CE is a first preset value, and the LCID whose value is the first preset value is for indicating the first-type MAC CE. When the second terminal apparatus receives the MAC CE corresponding to the LCID having the first preset value, the first access network device indicates the second terminal apparatus to stop transmitting the second data to the first access network device. In this case, it may also be understood that the LCID indicates the second terminal apparatus to stop transmitting the second data to the first access network device.

Second-type MAC CE: This type of MAC CE includes an identifier of a preset logical channel, and this type of MAC CE is for indicating the second terminal apparatus to stop transmitting, to the first access network device, second data corresponding to the preset logical channel. The preset logical channel is used to transmit the data packet exchanged between the master station device and the slave station device. Herein, the identifier of the preset logical channel in the MAC CE and an LCID in a MAC subheader have different functions. A value of the LCID in the MAC subheader is a second preset value, and the LCID whose value is the second preset value is for indicating the second-type MAC CE. The MAC CE carrying the identifier of the preset logical channel indicates to stop transmitting the second data corresponding to the preset logical channel.

Figure 13:
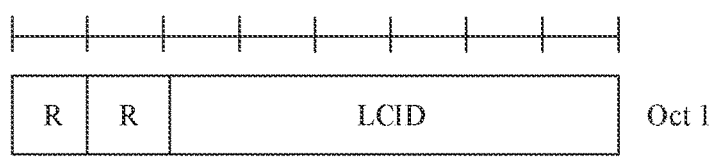
FIG. 13 is a schematic diagram of a structure of a medium access control control element according to an embodiment of this application.

Herein, there may be one identifier of the preset logical channel. For details, refer to FIG. 13. R is a reserved bit. The identifier of the preset logical channel may occupy a plurality of bits, for example, occupy five, six, or seven bits. A quantity of bits occupied by the identifier of the preset logical channel is not limited in this embodiment of this application.

Figure 14:
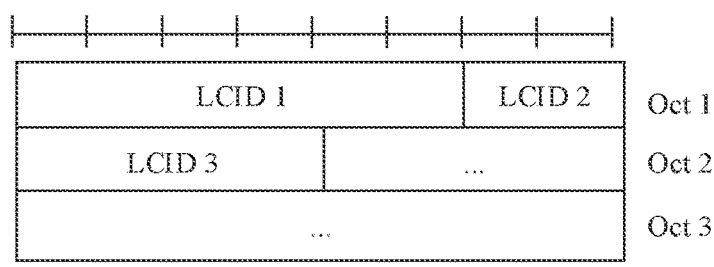
FIG. 14 is a schematic diagram of a structure of another medium access control control element according to an embodiment of this application.
Figure 15:
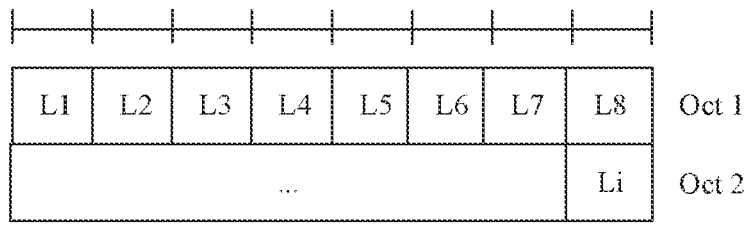
FIG. 15 is a schematic diagram of a structure of still another medium access control control element according to an embodiment of this application.

Herein, there may be a plurality of identifiers of the preset logical channel. In some embodiments, the MAC CE includes a plurality of identifiers of the preset logical channel. For details, refer to FIG. 14. In FIG. 14, each LCID is one identifier of the preset logical channel. For example, LCID 1 is the $1^{st}$ identifier of the preset logical channel, LCID 2 is the $2^{nd}$ identifier of the preset logical channel, and LCID 3 is the $3^{rd}$ identifier of the preset logical channel. In this case, a length of the MAC CE is variable. The length of the MAC CE varies with a quantity of identifiers of the preset logical channel. When the quantity of identifiers of the preset logical channel is small, the length of the MAC CE is small. When the quantity of identifiers of preset logical channel is large, the length of the MAC CE is large. In some other embodiments, to reduce a quantity of bits, one bit in the MAC CE corresponds to one preset logical channel. For details, refer to FIG. 15. In FIG. 15, one bit corresponds to one preset logical channel. A quantity of preset logical channels is i. L1 indicates the $1^{st}$ preset logical channel, L2 indicates the $2^{nd}$ preset logical channel, ..., and Li indicates the $i^{th}$ preset logical channel. If a bit is 1, it indicates stopping transmitting, to the first access network device, second data of a preset logical channel corresponding to the bit. Alternatively, if a bit is 0, it indicates stopping transmitting, to the first access network device, second data of a preset logical channel corresponding to the bit. Third-type MAC CE: This type of MAC CE includes a sequence number of a data packet, and this type of MAC CE is for indicating the second terminal apparatus to stop transmitting, to the first access network device, second data corresponding to the sequence number. Herein, a value of an LCID in a MAC subheader is a third preset value, and the LCID whose value is the third preset value is for indicating the third-type MAC CE.

Figure 16:
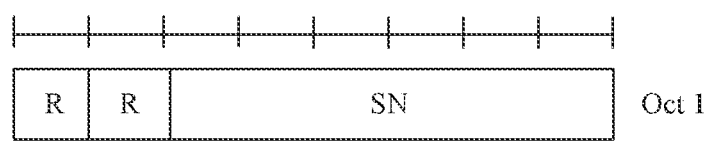
FIG. 16 is a schematic diagram of a structure of still another medium access control control element according to an embodiment of this application.

Herein, there may be one sequence number (SN) of the data packet in the MAC CE. For details, refer to FIG. 16. R is a reserved bit. A sequence number of one data packet may occupy a plurality of bits, for example, occupy five, six, or seven bits. A quantity of bits occupied by the sequence number of the data packet is not limited in this embodiment of this application.

Figure 17:
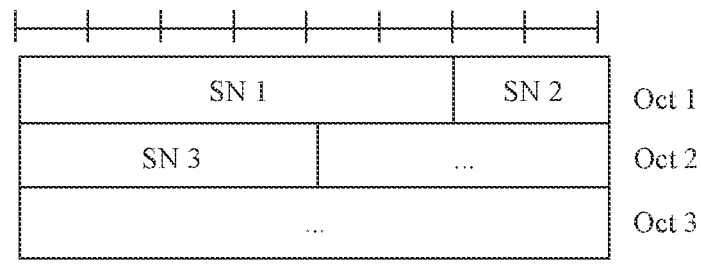
FIG. 17 is a schematic diagram of a structure of still another medium access control control element according to an embodiment of this application.

Herein, there may be a plurality of sequence numbers of the data packet. In some embodiments, the MAC CE includes sequence numbers of a plurality of data packets. For details, refer to FIG. 17. In FIG. 17, SN 1 is a sequence number of the $1^{st}$ data packet, SN 2 is a sequence number of the $2^{nd}$ data packet, SN 3 is a sequence number of the $3^{rd}$ data packet, and so on. In this case, a length of the MAC CE is also variable. The length of the MAC CE varies with a quantity of sequence numbers of data packets. When a quantity of sequence numbers of data packets is small, the length of the MAC CE is small. When a quantity of sequence numbers of data packets is large, the length of the MAC CE is large.

Figure 18:
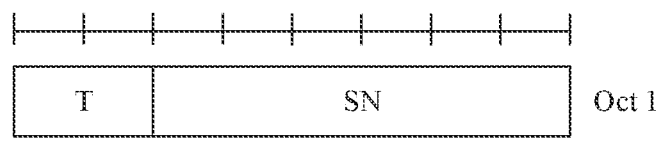
FIG. 18 is a schematic diagram of a structure of still another medium access control control element according to an embodiment of this application.

The sequence number of the data packet may be a sequence number of a radio link control (RLC) layer, a sequence number of a packet data convergence protocol (PDCP) layer, a sequence number of a GTP-U layer, a sequence number of an application layer, or another sequence number having an indication function. Because there are a plurality of types of sequence numbers of data packets, the MAC CE includes a type indication field T, as shown in FIG. 18. The type indication field T indicates a type of sequence number included in the MAC CE. A quantity of bits occupied by the type indication field T is related to a quantity of types of SNs. The quantity of bits occupied by the type indication field T may be a positive integer greater than or equal to 0. For example, the type indication field T occupies one, two, or more bits. In some embodiments, one bit in the type indication field T corresponds to one type of SN. If a value of the bit is 1, it indicates that the current MAC CE includes a type of SN corresponding to the bit; or if a value of the bit is 0, it indicates that the current MAC CE includes a type of SN corresponding to the bit. In some other embodiments, each type of SN corresponds to one index, and a value of the type indication field T indicates an index of a type of SN, to indicate that the current MAC CE includes a type of SN corresponding to the index.

Fourth-type MAC CE: This type of MAC CE includes a preset data radio bearer identifier (DRB ID), and this type of MAC CE is for indicating the second terminal apparatus to stop transmitting, to the first access network device, second data corresponding to the data radio bearer identifier. A data radio bearer identified by the preset data bearer identifier is used to transmit the data packet exchanged between the master station device and the slave station device. Herein, a value of an LCID in a MAC subheader is a fourth preset value, and the LCID whose value is the fourth preset value is for indicating the fourth-type MAC CE. The fourth-type MAC CE carrying the DRB ID indicates to stop transmitting the second data corresponding to the data radio bearer identifier.

Figure 19:
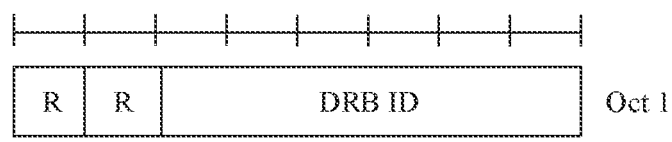
FIG. 19 is a schematic diagram of a structure of still another medium access control control element according to an embodiment of this application.

Herein, there may be one identifier of a preset data radio bearer. For details, refer to FIG. 19. R is a reserved bit. The identifier of the preset data radio bearer may occupy a plurality of bits, for example, occupy five, six, or seven bits. A quantity of bits occupied by the identifier of the preset data radio bearer is not limited in this embodiment of this application.

Figure 20:
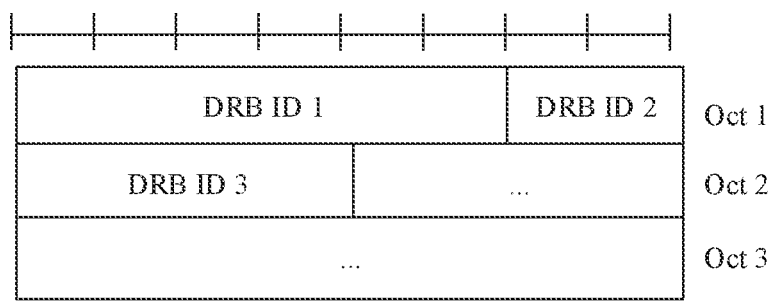
FIG. 20 is a schematic diagram of a structure of still another medium access control control element according to an embodiment of this application.
Figure 21:
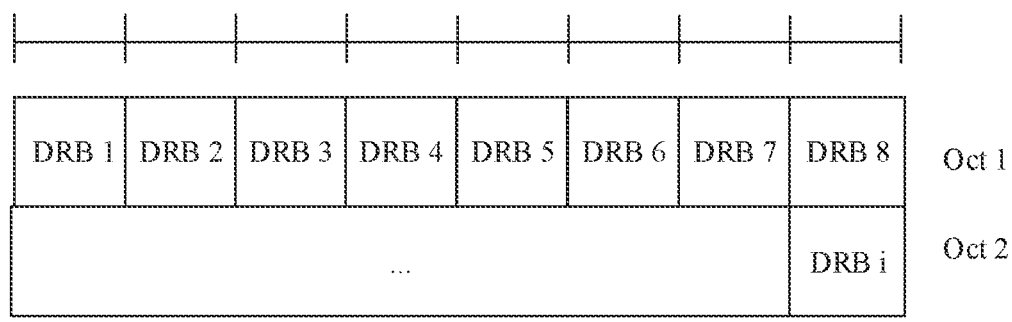
FIG. 21 is a schematic diagram of a structure of still another medium access control control element according to an embodiment of this application.

Herein, there may be a plurality of identifiers of the preset data radio bearer. In some embodiments, the MAC CE includes a plurality of identifiers of the preset data radio bearer. For details, refer to FIG. 20. In FIG. 20, LCID 1 is the $1^{st}$ identifier of the preset data radio bearer, LCID 2 is the $2^{nd}$ identifier of the preset data radio bearer, and LCID 3 is the $3^{rd}$ identifier of the preset data radio bearer. In this case, a length of the MAC CE is variable. The length of the MAC CE varies with a quantity of identifiers of the preset data radio bearer. When the quantity of identifiers of the preset data radio bearer is small, the length of the MAC CE is small. When the quantity of identifiers of the preset data radio bearer is large, the length of the MAC CE is large. In some other embodiments, to reduce a quantity of bits, one bit in the MAC CE corresponds to one data radio bearer identifier. For details, refer to FIG. 21. In FIG. 21, one bit corresponds to one data radio bearer identifier. A quantity of preset data radio bearer identifiers is i. DRB 1 indicates the $1^{st}$ preset data radio bearer identifier. DRB 2 indicates the $2^{nd}$ preset data radio bearer identifier, . . . , and DRB i indicates the $i^{th}$ preset data radio bearer identifier. If a bit is 1, it indicates stopping transmitting, to the first access network device, second data of a data radio bearer corresponding to the bit. Alternatively, if the bit is 0, it indicates stopping transmitting, to the first access network device, second data of a data radio bearer corresponding to the bit.

Herein, precision of indicating, by different types of MAC CEs, the second data whose transmission stops is different. In the first-type MAC CE, the second-type MAC CE, and the third-type MAC CE, compared with the second data indicated by the first-type MAC CE, the second data that is indicated by the second-type MAC CE and whose transmission stops corresponds to the preset logical channel, the indication is more precise, and the granularity is finer. Compared with the second data that is indicated by the second-type MAC CE and that corresponds to the preset logical channel, the second data that is indicated by the third-type MAC CE and whose transmission stops corresponds to the transmission sequence number, and an indication granularity is finer.

After a same data packet is transmitted along two mutually redundant paths (the first path and the second path), the obtained first data and second data are the same. In this way, a data packet is successfully transmitted along the first path. In other words, after the first access network device receives the first data from the first terminal apparatus, the first access network device does not need to receive the second data, and the transmission indication information indicates the second terminal apparatus to stop transmitting the corresponding second data to the first access network device, to save data transmission resources.

Optionally, the second data may be transmitted by using a preconfigured resource, for example, a resource of a configured grant type 1 or a configured grant type 2. Alternatively, transmission may be performed by using a resource dynamically scheduled by the first access network device. To be specific, a resource of a physical downlink data channel scheduled by using a physical downlink control channel for the terminal apparatus is used to transmit the second data. In another implementation, the first access network device may not send the transmission indication information, but stops scheduling the resource, so that the second terminal apparatus cannot obtain the resource for transmitting the second data, and stops transmitting the second data.

It may be understood that, in another possible implementation, after the first access network device receives the first data from the first terminal apparatus in S904, if quality of the first data satisfies a service requirement, for example, a packet loss rate of the first data is less than or equal to a preset value, the first access network device does not need to receive a data packet returned by another path, and the first access network device performs S905; if quality of the first data cannot satisfy a service requirement, for example, a packet loss rate of the first data is greater than a preset value, the first access network device waits to receive the data packet returned by another path, and the first access network device does not perform S905, so that the first access network device receives the second data from the second terminal apparatus, to ensure reliable transmission of data.

Figure 22:
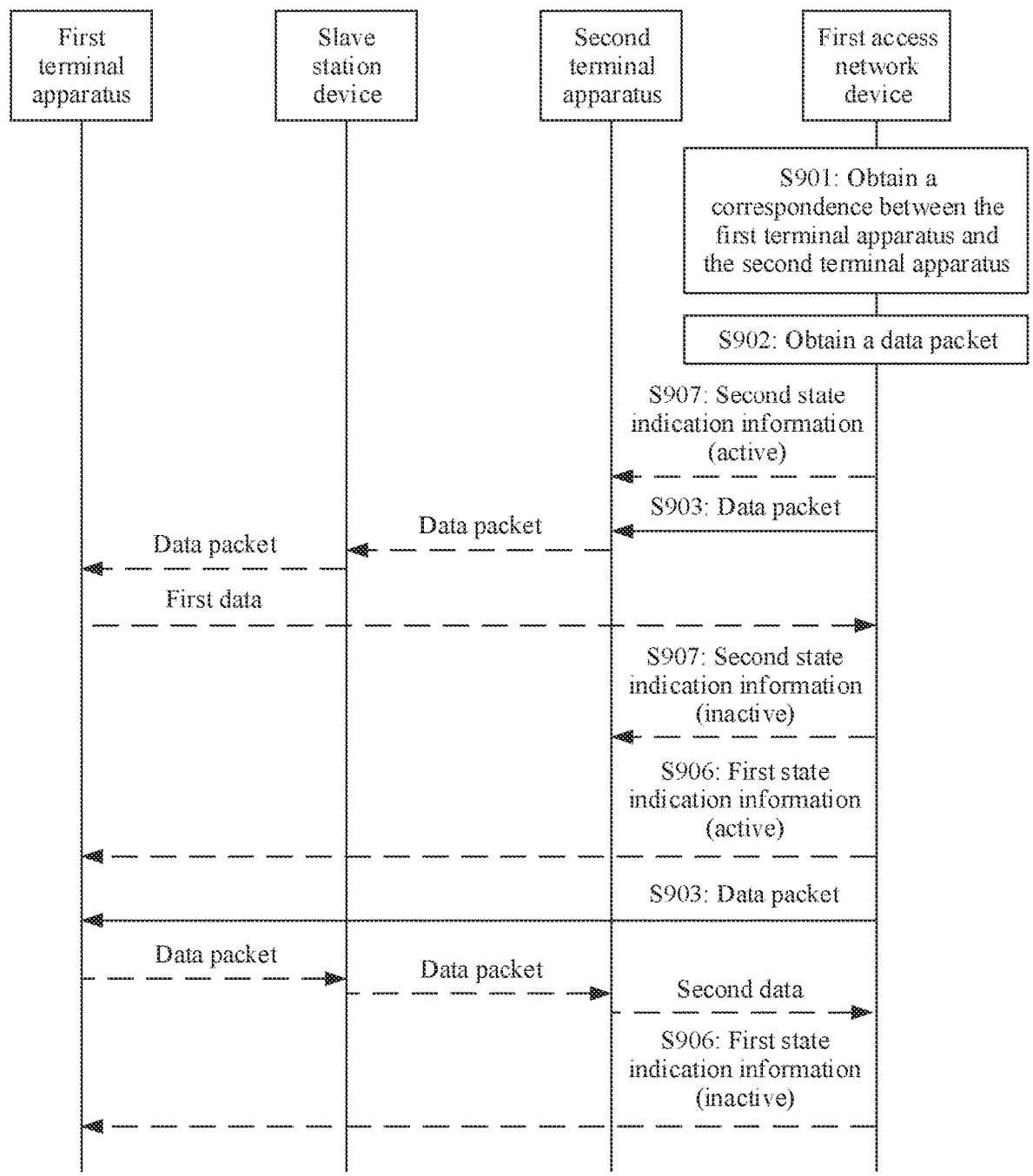
FIG. 22 is a schematic flowchart of yet another communication method according to an embodiment of this application.

Optionally, to improve flexibility of configuring a redundant path, refer to FIG. 22. The communication method provided in this embodiment of this application further includes S906 and/or S907.

S906: The first access network device sends first state indication information to the first terminal apparatus.

Accordingly, the first terminal apparatus receives the first state indication information from the first access network device.

The first state indication information indicates that the second path is in an active state or an inactive state. If the second path is in the active state, the second path transmits the data packet. If the second path is in the inactive state, the second path does not need to transmit the data packet.

After receiving the first state indication information from the first access network device, the first terminal apparatus sets, based on the first state indication information, the second path to be in the active state or the inactive state.

Optionally, the first state indication information includes time information, and the first state indication information indicates to set, at a time point corresponding to the time information, the second path to be in the active state or the inactive state. The time information includes at least one of the following information: a system frame number (SFN), a slot number in the SFN, and a time domain symbol in a slot. For example, if the system frame number is used as the time information, the first terminal apparatus sets the second path to be in the active state or the inactive state at a frame boundary of the system frame number or at a frame boundary of a frame adjacent to the system frame number.

The first state indication information does not include the time information. In this case, the first terminal apparatus receives the first state indication information, and then the first terminal apparatus sets, at a moment in a default time period, the second path to be in the active state or the inactive state.

Optionally, the first state indication information may be carried in downlink control information (DCI), a medium access control (MAC) sub protocol data unit (PDU), or dedicated signaling. Specifically, the MAC subPDU includes a MAC subheader and a medium access control (MAC) control element (CE). The MAC subheader includes a logical channel identifier (LCID). The LCID having a preset value is for indicating that a MAC CE corresponding to the MAC subheader includes the first state indication information (is the first state indication information or carries the first state indication information).

For example, refer to FIG. 22. If the second path is in the inactive state before the first access network device performs S903, the first access network device performs S906 before sending the data packet to the first terminal apparatus. In this case, the first state indication information indicates that the second path is in the active state. Then, the first access network device sends the data packet to the first terminal apparatus, so that the data packet is transmitted along the second path. The first access network device may perform S906 after receiving the data packet (namely, the second data) returned along the second path. In this case, the first state indication information indicates that the second path is in the inactive state.

If the second path is in the active state before the first access network device performs S903, before sending the data packet to the first terminal apparatus, the first access network device does not need to perform S906, and does not need to indicate, to the first terminal apparatus, that the second path is in the active state. The first access network device may perform S906 after receiving the data packet (namely, the second data) returned along the second path. In this case, the first state indication information indicates that the second path is in the inactive state.

S907: The first access network device sends second state indication information to the second terminal apparatus.

Accordingly, the second terminal apparatus receives the second state indication information from the first access network device.

The second state indication information indicates that the first path is in an active state or an inactive state.

After receiving the second state indication information from the first access network device, the second terminal apparatus sets, based on the second state indication information, the first path to be in the active state or the inactive state.

Optionally, the second state indication information includes time information, and the second state indication information indicates the second terminal apparatus to set, at a time point corresponding to the time information, the first path to be in the active state or the inactive state. The time information includes at least one of the following information: an SFN, a slot number in the SFN, and a time domain symbol in a slot.

The second state indication information does not include the time information. In this case, the second terminal apparatus receives the second state indication information, and then the second terminal apparatus sets, at a moment in a default time period, the first path to be in the active state or the inactive state.

Optionally, the second state indication information may alternatively be carried in DCI, a MAC subPDU, or dedicated signaling. Specifically, the MAC subPDU includes a MAC subheader and a MAC CE. The MAC subheader includes an LCID. The LCID having a preset value is for indicating that a MAC CE corresponding to the MAC subheader includes the second state indication information (is the second state indication information or carries the second state indication information).

For example, refer to FIG. 22. If the first path is in the inactive state before the first access network device performs S903, the first access network device performs S907 before sending the data packet to the second terminal apparatus. In this case, the second state indication information indicates that the first path is in the active state. Then, the first access network device sends the data packet to the second terminal apparatus, so that the data packet is transmitted along the first path. The first access network device may perform S907 after receiving the data packet (namely, the second data) returned along the first path. In this case, the first state indication information indicates that the first path is in the inactive state.

If the first path is in the active state before the first access network device performs S903, before sending the data packet to the second terminal apparatus, the first access network device does not need to perform S907, and does not need to indicate, to the second terminal apparatus, that the first path is in the active state. The first access network device may perform S907 after receiving the data packet (namely, the second data) returned along the first path. In this case, the second state indication information indicates that the first path is in the inactive state.

In this way, the first access network device indicates a state of one path or states of two paths to the terminal apparatus by using the state indication information. When the first access network device transmits the data packet exchanged between the master station device and the slave station device, if channel quality is poor, the first access network device indicates, to the first terminal apparatus by using the first state indication information, that the second path is in the active state, and the first access network device indicates, to the second terminal apparatus by using the second state indication information, that the first path is in the active state, so that a same data packet is transmitted along the two paths, to ensure data transmission reliability. If channel quality is good, the first access network device indicates, to the first terminal apparatus by using the first state indication information, that the second path is in the active state, or the first access network device indicates, to the second terminal apparatus by using the second state indication information, that the first path is in the active state, so that the data packet can be transmitted along one path, to save transmission resources. When the first access network device transmits the data packet exchanged between the first access network device and the terminal apparatus, the first access network device indicates, to the first terminal apparatus by using the first state indication information, that the second path is in the inactive state, and the first access network device indicates, to the second terminal apparatus by using the second state indication information, that the first path is in the inactive state. In this way, the data packet is no longer transmitted along the first path or the second path. In other words, the first access network device indicates, to a terminal apparatus by using state indication information, that a path is in an active state or an inactive state, to satisfy different service requirements or radio channel quality, and save air interface resources.

Optionally, in another possible implementation, after S901 or S902, a specific process in which "the first access network device delivers the data packet to the terminal apparatus" may alternatively include: The first access network device first sends a data packet to one terminal apparatus based on the correspondence between the two terminal apparatuses, so that the data packet is transmitted along one path. Herein, if the data packet is successfully transmitted along the path, in other words, the first access network device receives the returned data packet in preset time, the first access network device does not need to send the data packet to the other terminal apparatus. If the data packet fails to be transmitted along the path, in other words, the first access network device does not receive the returned data packet in preset time, the first access network device sends the data packet to the other terminal apparatus, so that the data packet is transmitted along the other path. The first access network device receives the data packet returned along the other path. The first access network device sends the same data packet to the two terminal apparatuses, and the two paths are mutually redundant. Specifically, the first access network device schedules a downlink transmission resource, to send the data packet to the terminal apparatus. Further, the first access network device schedules an uplink transmission resource, to receive the data packet returned by the terminal apparatus.

Figure 23:
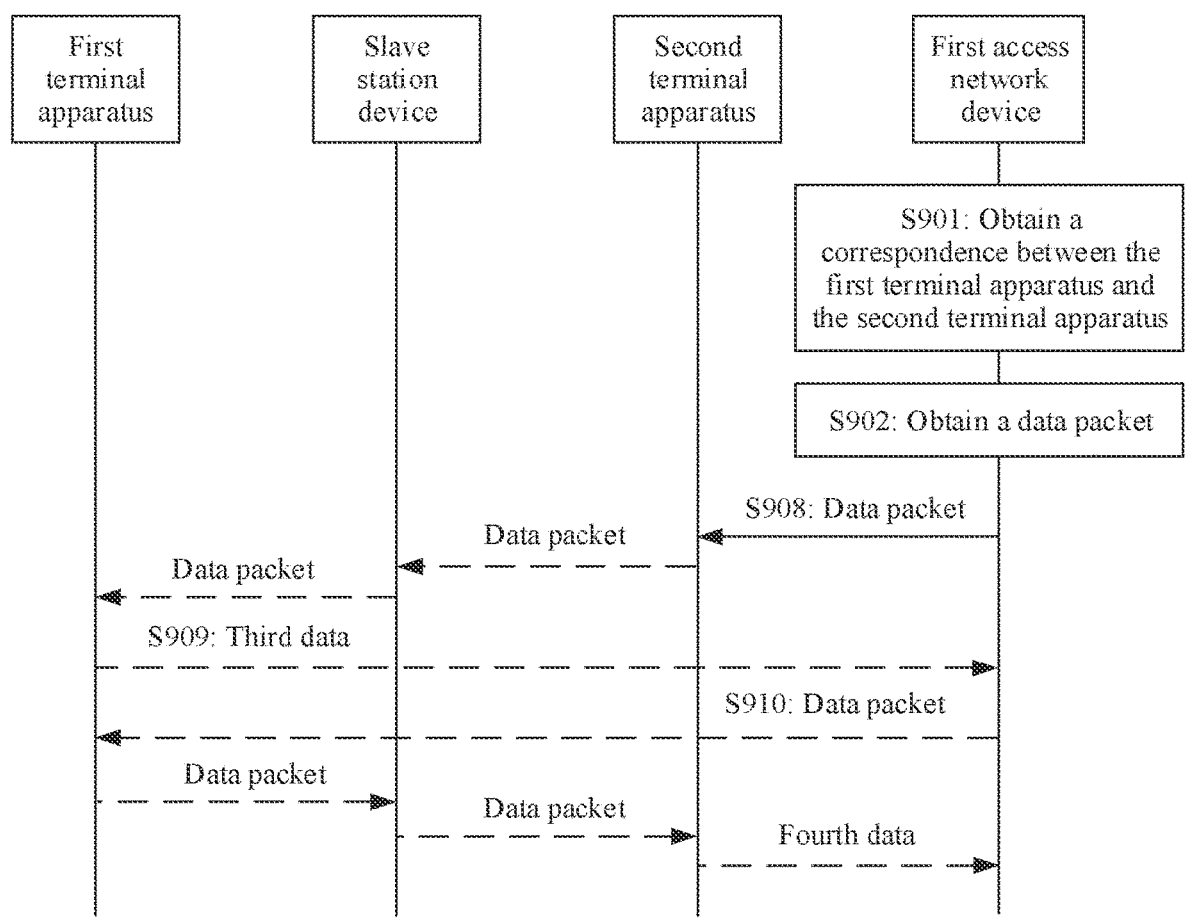
FIG. 23 is a schematic flowchart of yet another communication method according to an embodiment of this application.

In the following, refer to FIG. 23. An example in which the first access network device first sends the data packet to the second terminal apparatus is used for description.

S908: The first access network device sends the data packet to the second terminal apparatus based on the correspondence. Accordingly, the second terminal apparatus receives the data packet from the first access network device.

The correspondence is the foregoing "correspondence between the first terminal apparatus and the second terminal apparatus".

The data packet sent by the first access network device to the second terminal apparatus is transmitted along the first path. The first path is from the second terminal apparatus to the first terminal apparatus via the at least one slave station device. When the data packet passes through each slave station device, the slave station device may read data sent by the master station device to the slave station device, and write data to be sent to the master station device into the data packet.

Herein, if the data packet is successfully transmitted along the first path, in other words, the first access network device performs S909 in preset time, the first access network device does not need to perform S910. If the data packet fails to be transmitted along the first path, in other words, the first access network device does not perform S909 in preset time, the first access network device performs S910, so that the data packet is transmitted along the other path. S909 and S910 are specifically described as follows:

S909: The first terminal apparatus sends third data to the first access network device. Accordingly, the first access network device receives the third data from the first terminal apparatus.

The third data is data obtained by transmitting the data packet along the first path.

In this application, in a scenario in which the first access network device first sends the data packet to one terminal apparatus, data obtained by transmitting the data packet along a first path (from the second terminal apparatus to the first terminal apparatus via the slave station device) is described as "third data".

S910: The first access network device sends the data packet to the first terminal apparatus based on the correspondence. Accordingly, the first terminal apparatus receives the data packet from the first access network device.

The data packet in S910 is the same as the data packet in S908. After receiving the data packet, the first terminal apparatus forwards the data packet to the slave station device, so that the data packet is transmitted along the second path and returned to the first access network device. In this application, in a scenario in which the first access network device first sends a data packet to one terminal apparatus, data obtained by transmitting the data packet along the second path (from the first terminal apparatus to the second terminal apparatus via the slave station device) is described as "fourth data". Herein, after a same data packet is transmitted along two mutually redundant paths (the first path and the second path), the obtained third data and fourth data are the same. In this way, if a data packet is successfully transmitted along the first path, in other words, after the first access network device receives the third data from the first terminal apparatus, the data packet does not need to be transmitted along the second path. Therefore, the first access network device does not need to send the data packet to the first terminal apparatus, to save data transmission resources. If a data packet fails to be transmitted along the first path, the first access network device sends a same data packet to the first terminal apparatus, so that the data packet is transmitted along the other path and returned to the first access network device, to improve data transmission reliability.

It may be understood that, if the data packet is successfully transmitted along the first path, in other words, the first access network device performs S909 in preset time, and quality of the third data satisfies a service requirement, for example, a packet loss rate of the third data is less than or equal to a preset value, the data packet does not need to be transmitted along the other path, in other words, the first access network device does not need to perform S910. If quality of the third data cannot satisfy a service requirement, for example, a packet loss rate of the third data is greater than a preset value, the first access network device still performs S910, so that the data packet is transmitted along the other path and returned to the first access network device, to ensure data transmission reliability.

Figure 24:
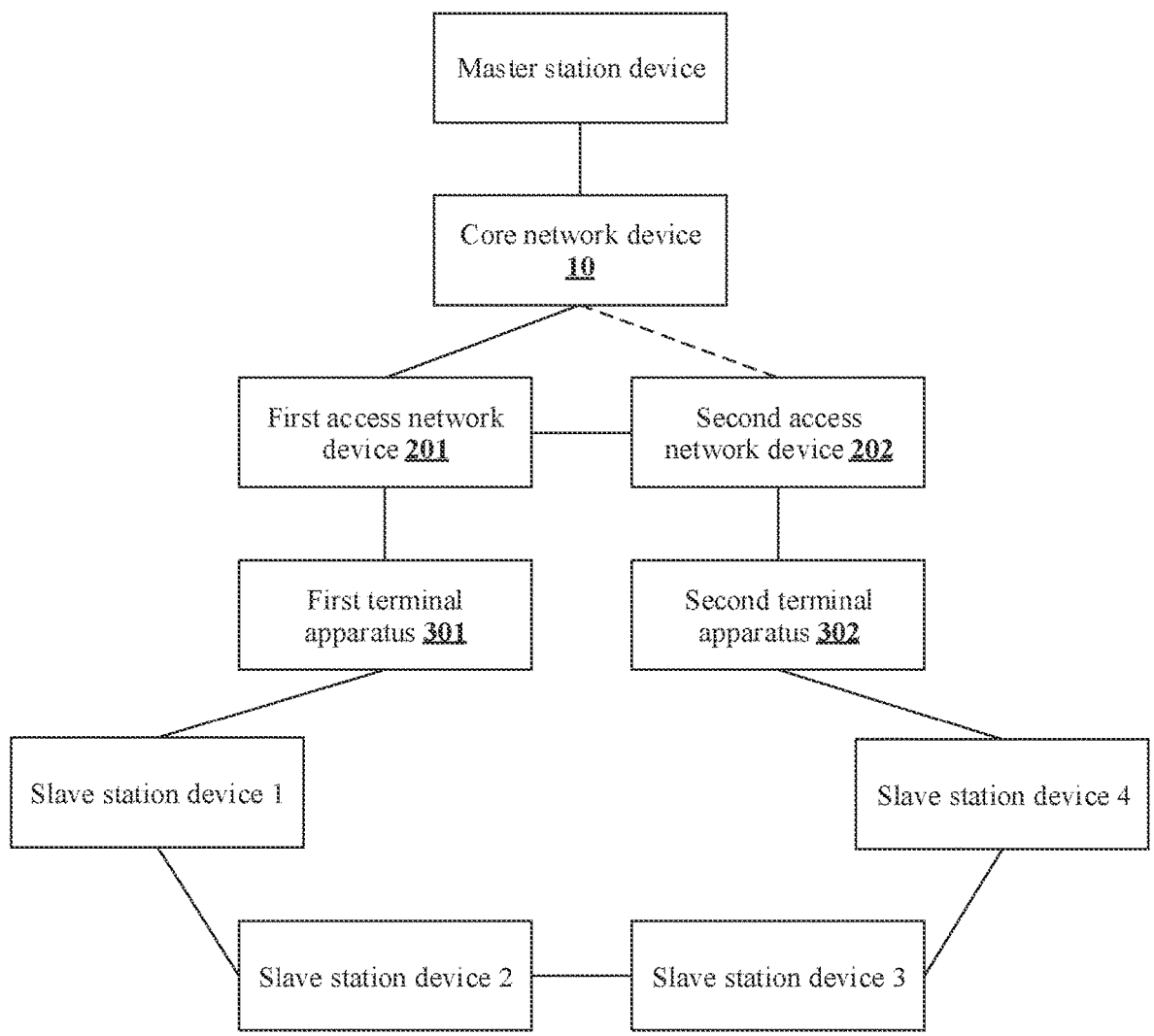
FIG. 24 is another schematic diagram of application of a wireless communication network to an industrial Ethernet according to an embodiment of this application.

The foregoing communication methods are all for a network architecture in which two terminal apparatuses are connected to a same access network device. When two terminal apparatuses are connected to different access network devices, a network architecture applicable to the industrial Ethernet is shown in FIG. 24. Refer to FIG. 24. There are two access network devices: a first access network device 201 and a second access network device 202. The first access network device 201 is connected to a first terminal apparatus 301, and the second access network device 202 is connected to a second terminal apparatus 302. The first access network device 201 exchanges information with the second access network device 202, and an interface between the two access network devices may be an X2 interface or an Xn interface. The information exchanged between the two access network devices is carried in an X2 message or an Xn message. Anchors of the two access network devices are located on the first access network device 201. The first access network device 201 receives a data packet from a core network device 10, or sends a data packet to the core network device 10. A dashed line between the core network device 10 and the second access network device 202 indicates that control plane signaling is transmitted between the core network device 10 and the second access network device 202.

Based on the network architecture shown in FIG. 24, in the communication method provided in embodiments of this application, for an exchange process between the first terminal apparatus and the first access network device, refer to related descriptions of S9011, S903, S904, S906, S909, and S910. Details are not described herein again. For an exchange process between the first access network device and the core network device, refer to related descriptions of S9014 and S9015. Details are not described herein again. A process of exchanging information between the second terminal apparatus and the first access network device is as follows:

First, a process in which the second terminal apparatus reports second redundancy identification information, that is, a specific implementation step of S9012, is as follows: The second terminal apparatus sends the second redundancy identification information to the second access network device, and then the second access network device sends the second redundancy identification information to the first access network device.

Second, a process in which the first access network device delivers a data packet to the second terminal apparatus, that is, a specific implementation step of S903, is as follows:

The first access network device sends the data packet to the second access network device, and then the second access network device sends the data packet to the second terminal apparatus. Herein, the data packet sent by the first access network device to the second access network device is the same as the data packet sent by the first access network device to the first terminal apparatus.

Third, a process in which the first access network device sends transmission indication information to the second terminal apparatus, that is, a specific implementation step of S905, is as follows: The first access network device sends the transmission indication information to the second access network device, and then the second access network device sends the transmission indication information to the second terminal apparatus.

Fourth, a process in which the first access network device sends second state indication information to the second terminal apparatus, that is, a specific implementation step of S907, is as follows: The first access network device sends the second state indication information to the second access network device, and then the second access network device sends the second state indication information to the second terminal apparatus.

Fifth, a specific implementation step of a process in which the second terminal apparatus sends the returned data packet to the first access network device is as follows: The second terminal apparatus sends the data packet to the second access network device, and then the second access network device sends the data packet to the first access network device. It may be understood that in the foregoing embodiments, the methods and/or steps implemented by the first access network device may alternatively be implemented by a component (for example, a chip or a circuit) that can be used in the first access network device. The methods and/or steps implemented by the first terminal apparatus may alternatively be implemented by a component (for example, a chip or a circuit) that can be used in the first terminal apparatus. The methods and/or steps implemented by the second terminal apparatus may alternatively be implemented by a component (for example, a chip or a circuit) that can be used in the second terminal apparatus. The methods and/or steps implemented by the core network device may alternatively be implemented by a component (for example, a chip or a circuit) that can be used in the core network device.

The foregoing mainly describes the solutions provided in embodiments of this application from a perspective of interaction between network elements. Correspondingly, an embodiment of this application further provides a communication apparatus. The communication apparatus may be the network element in the foregoing method embodiment, or an apparatus including the foregoing network element, or a component that can be used in the network element. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 25:
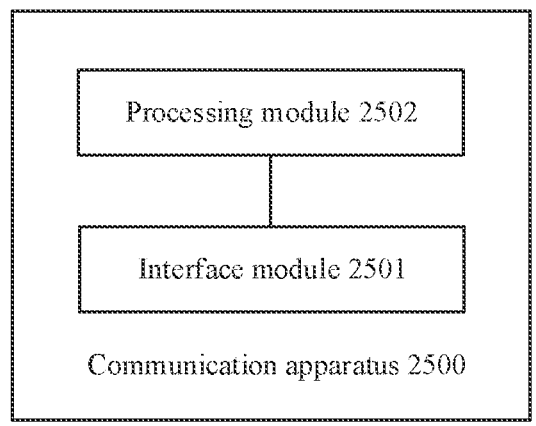
FIG. 25 is a schematic composition diagram of a communication apparatus according to an embodiment of this application.

FIG. 25 is a schematic diagram of a structure of a communication apparatus 2500. The communication apparatus 2500 includes an interface module 2501 and a processing module 2502. The interface module 2501 is an interface circuit of the apparatus, and is configured to receive a signal from another apparatus or send a signal to another apparatus. For example, when the apparatus is implemented in a manner of a chip, the interface module 2501 is an interface circuit that is of the chip and that is configured to receive a signal from another chip or apparatus. Alternatively, the interface module 2501 is an interface circuit that is of the chip and that is configured to send a signal to another chip or apparatus.

For example, the communication apparatus 2500 is the access network device in the foregoing method embodiments.

The interface module 2501 is configured to obtain a correspondence between a first terminal apparatus and a second terminal apparatus. The interface module 2501 is further configured to obtain a data packet. The processing module 2502 is configured to send the data packet to the first terminal apparatus and the second terminal apparatus based on the correspondence.

In a possible design, the interface module 2501 is further configured to receive first data from the first terminal apparatus. The interface module 2501 is further configured to send transmission indication information to the second terminal apparatus, where the transmission indication information indicates the second terminal apparatus to stop transmitting second data to the access network device. The first data is data obtained by transmitting the data packet along a first path, and the second data is data obtained by transmitting the data packet along a second path. The first path is from the second terminal apparatus to the first terminal apparatus via at least one slave station device, and the second path is from the first terminal apparatus to the second terminal apparatus via the at least one slave station device.

In a possible design, that the processing module 2502 is configured to obtain a correspondence between a first terminal apparatus and a second terminal apparatus includes. The processing module 2502 is configured to obtain the correspondence between the first terminal apparatus and the second terminal apparatus from the first terminal apparatus, the second terminal apparatus, or a core network device.

In a possible design, that the processing module 2502 is configured to obtain a correspondence between a first terminal apparatus and a second terminal apparatus includes: The interface module 2501 is configured to receive first redundancy identification information from the first terminal apparatus. The interface module 2501 is further configured to receive second redundancy identification information from the second terminal apparatus. The processing module 2502 is configured to determine the correspondence between the first terminal apparatus and the second terminal apparatus based on the first redundancy identification information and the second redundancy identification information.

In a possible design, the interface module 2501 is further configured to receive a first redundancy sequence number (RSN) from the first terminal apparatus and a second RSN from the second terminal apparatus.

In a possible design, the interface module 2501 is further configured to receive an identifier of a first logical channel from the first terminal apparatus and an identifier of a second logical channel from the second terminal apparatus.

In a possible design, the interface module 2501 is further configured to send first state indication information to the first terminal apparatus; and/or the interface module 2501 is further configured to send second state indication information to the second terminal apparatus, where the first state indication information indicates that the second path is in an active state or an inactive state, and the second state indication information indicates that the first path is in an active state or an inactive state.

For example, the communication apparatus 2500 is the terminal apparatus in the foregoing method embodiments.

The interface module 2501 is configured to receive a first data packet from an access network device, where the first data packet includes data sent by a master station device to at least one slave station device. The interface module 2501 is further configured to send the first data packet to the at least one slave station device. The interface module 2501 is further configured to receive a second data packet, where the second data packet includes data sent by the at least one slave station device to the master station device, and the second data packet is obtained by processing a data packet the same as the first data packet by the at least one slave station device.

In a possible design, the interface module 2501 is further configured to send the second data packet to the access network device.

In a possible design, the interface module 2501 is further configured to send a correspondence between the terminal apparatus and another terminal apparatus to the access network device.

In a possible design, the interface module 2501 is further configured to send redundancy identification information to the access network device, where the redundancy identification information includes at least one of the following information: an identifier of the master station device, an identifier of the at least one slave station device, an identifier of a slave station device list, an identifier of the terminal apparatus, and an identifier of the another terminal apparatus. There is a correspondence between the another terminal apparatus and the terminal apparatus.

In a possible design, the interface module 2501 is further configured to send a redundancy sequence number (RSN) to the access network device.

In a possible design, the interface module 2501 is further configured to send a logical channel identifier to the access network device.

In a possible design, the interface module 2501 is further configured to receive transmission indication information from the access network device, where the transmission indication information indicates the terminal apparatus to stop transmitting the second data packet to the access network device.

In a possible design, the interface module 2501 is further configured to receive state indication information from the access network device, where the state indication information indicates that a path is in an active state or an inactive state, and the path is from the terminal apparatus to the another terminal apparatus via the at least one slave station device. The processing module 2502 is configured to set, based on the state indication information, the path to be in the active state or the inactive state.

For example, the communication apparatus 2500 is the core network device in the foregoing method embodiments.

The processing module 2502 is configured to determine a correspondence between a first terminal apparatus and a second terminal apparatus. The interface module 2501 is configured to send correspondence indication information to a first access network device, where the correspondence indication information indicates the correspondence between the first terminal apparatus and the second terminal apparatus.

In a possible design, that the processing module 2502 is configured to determine a correspondence between a first terminal apparatus and a second terminal apparatus includes: The processing module 2502 is configured to determine the correspondence between the first terminal apparatus and the second terminal apparatus based on subscription information of the first terminal apparatus and subscription information of the second terminal apparatus.

Alternatively, the interface module 2501 is configured to obtain first redundancy identification information from the first terminal apparatus and second redundancy identification information from the second terminal apparatus. The processing module 2502 is configured to determine the correspondence between the first terminal apparatus and the second terminal apparatus based on the first redundancy identification information and the second redundancy identification information.

All related content of the steps in the foregoing method embodiments may be cited in function descriptions of corresponding function modules. Details are not described herein again.

In this embodiment, the communication apparatus 2500 is presented with the function modules divided through integration. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the communication apparatus 2500 may be in a form of a communication apparatus 2600 shown in FIG. 26.

Figure 26:
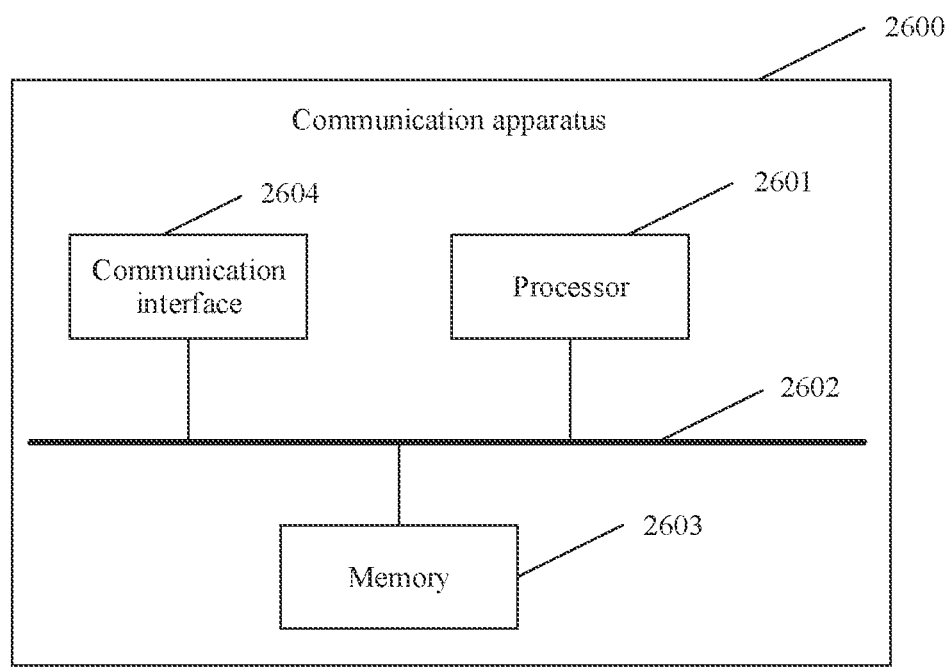
FIG. 26 is a schematic diagram of a hardware structure of a communication apparatus according to an embodiment of this application.

For example, a processor 2601 in the communication apparatus 2600 shown in FIG. 26 may invoke computer-executable instructions stored in a memory 2603, so that the communication apparatus 2600 performs the communication method in the foregoing method embodiments.

Specifically, functions/implementation processes of the interface module 2501 and the processing module 2502 in FIG. 25 may be implemented by the processor 2601 in the communication apparatus 2600 shown in FIG. 26 by invoking the computer-executable instructions stored in the memory 2603. Alternatively, functions/implementation processes of the processing module 2502 in FIG. 25 may be implemented by the processor 2601 in the communication apparatus 2600 shown in FIG. 26 by invoking the computer-executable instructions stored in the memory 2603, and functions/implementation processes of the interface module 2501 in FIG. 25 may be implemented by using a communication interface 2604 in the communication apparatus 2600 shown in FIG. 26. The processor 2601, the memory 2603, and the communication interface 2604 are connected by using a bus 2602.

The communication apparatus 2500 provided in this embodiment can perform the foregoing communication method. Therefore, for a technical effect that can be achieved by the communication apparatus 2500, refer to the foregoing method embodiment. Details are not described herein again.

It should be noted that one or more of the foregoing modules or units may be implemented by using software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built in a SoC (system on chip) or an application-specific integrated circuit (ASIC), or may be an independent semiconductor chip. The processor includes a core for executing software instructions to perform operations or processing, and may further include a necessary hardware accelerator, for example, a field programmable gate array (FPGA), a programmable logic circuit (programmable logic device, PLD), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a system on chip (SoC), an FPGA, a PLD, a dedicated digital circuit, a hardware accelerator, or a non-integrated discrete device, and the hardware may run necessary software or does not depend on software, to perform the foregoing method procedures.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. When the communication apparatus is a chip system, the communication device may include a chip, or may include a chip and another discrete component. This is not specifically limited in this embodiment of this application.

All or some of the foregoing embodiments may be implemented through software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In embodiments of this application, the term "a plurality of" means two or more. The term "and/or" describes an association relationship for describing associated objects and represents that three relationships may exist. For example, A and/or B may represent the following three cases: Only A exists, both A and B exist, and only B exists. In addition, an element that appears in singular forms "a", "an", and "the" does not mean "one or only one" unless otherwise specified in the context, but means "one or more". For example. "a device" means one or more such devices. Further, the term "at least one of . . . " means one or any combination of subsequent associated objects. For example, "at least one of A, B, and C" includes A, B, C, AB, AC, BC, or ABC. Determining Y based on X does not mean that Y is determined based on only X, and Y may be further determined based on X and other information.

Although this application is described with reference to embodiments, in a process of implementing this application that claims protection, a person skilled in the art may understand and implement another variation of the disclosed embodiments by viewing the appended drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A communication method, comprising:
  obtaining, by an access network device, a correspondence between a first terminal apparatus and a second terminal apparatus;
  obtaining, by the access network device, a data packet;
  sending, by the access network device, the data packet to the first terminal apparatus and the second terminal apparatus based on the correspondence;
  receiving, by the access network device, first data from the first terminal apparatus; and
  sending, by the access network device, transmission indication information to the second terminal apparatus, wherein the transmission indication information indicates the second terminal apparatus to stop transmitting second data to the access network device, wherein:
    the first data is data obtained by transmitting the data packet along a first path, and the second data is data obtained by transmitting the data packet along a second path; and
    the first path is from the second terminal apparatus to the first terminal apparatus via at least one slave station device, and the second path is from the first terminal apparatus to the second terminal apparatus via the at least one slave station device.

2. The communication method according to claim 1, wherein the transmission indication information is carried in a medium access control (MAC) sub protocol data unit (subPDU), the MAC subPDU comprises a MAC subheader and a MAC control element (CE), and the MAC subheader comprises a logical channel identifier (LCID), wherein:
  the transmission indication information comprises the LCID having a preset value, and the LCID having the preset value is for indicating the second terminal apparatus to stop transmitting the second data to the access network device; or
  the LCID having a preset value is for indicating that a MAC CE corresponding to the MAC subheader comprises the transmission indication information.

3. The communication method according to claim 2, wherein:
  a length of the MAC CE is a preset length, and the MAC CE is for indicating the second terminal apparatus to stop transmitting the second data to the access network device;
  the MAC CE comprises an identifier of a preset logical channel, and the MAC CE is for indicating the second terminal apparatus to stop transmitting, to the access network device, second data corresponding to the preset logical channel;
  the MAC CE comprises a sequence number of the data packet, and the MAC CE is for indicating the second terminal apparatus to stop transmitting, to the access network device, second data corresponding to the sequence number; or
  the MAC CE comprises an identifier of a data radio bearer, and the MAC CE is for indicating the second terminal apparatus to stop transmitting, to the access network device, second data corresponding to the data radio bearer.

4. The communication method according to claim 3, wherein the preset length is 0.

5. The communication method according to claim 1 wherein the obtaining, by an access network device, a correspondence between a first terminal apparatus and a second terminal apparatus comprises:
  obtaining the correspondence between the first terminal apparatus and the second terminal apparatus from the first terminal apparatus, the second terminal apparatus, or a core network device.

6. The communication method according to claim 1, wherein the obtaining, by an access network device, a correspondence between a first terminal apparatus and a second terminal apparatus comprises:
  receiving, by the access network device, first redundancy identification information from the first terminal apparatus;
  receiving, by the access network device, second redundancy identification information from the second terminal apparatus; and
  determining, by the access network device, the correspondence between the first terminal apparatus and the second terminal apparatus based on the first redundancy identification information and the second redundancy identification information.

7. The communication method according to claim 1, wherein the method further comprises:
  receiving, by the access network device, a redundancy sequence number (RSN) from the first terminal apparatus.

8. An access network device, comprising:
  at least one processor, and a non-transitory memory storing instructions for execution by the at least one processor, wherein, when executed, the instructions cause the access network device to perform operations comprising:
    obtaining a correspondence between a first terminal apparatus and a second terminal apparatus;
    obtaining a data packet;
    sending the data packet to the first terminal apparatus and the second terminal apparatus based on the correspondence;

receiving first data from the first terminal apparatus; and sending transmission indication information to the second terminal apparatus, wherein the transmission indication information indicates the second terminal apparatus to stop transmitting second data to the access network device, wherein:
- the first data is data obtained by transmitting the data packet along a first path, and the second data is data obtained by transmitting the data packet along a second path; and
- the first path is from the second terminal apparatus to the first terminal apparatus via at least one slave station device, and the second path is from the first terminal apparatus to the second terminal apparatus via the at least one slave station device.

9. The access network device according to claim 8, wherein the transmission indication information is carried in a medium access control (MAC) sub protocol data unit (subPDU), the MAC subPDU comprises a MAC subheader and a MAC control element (CE), and the MAC subheader comprises a logical channel identifier (LCID), wherein:
- the transmission indication information comprises the LCID having a preset value, and the LCID having the preset value is for indicating the second terminal apparatus to stop transmitting the second data to the access network device; or
- the LCID having a preset value is for indicating that a MAC CE corresponding to the MAC subheader comprises the transmission indication information.

10. The apparatus access network device according to claim 9, wherein:
- a length of the MAC CE is a preset length, and the MAC CE is for indicating the second terminal apparatus to stop transmitting the second data to the access network device;
- the MAC CE comprises an identifier of a preset logical channel, and the MAC CE is for indicating the second terminal apparatus to stop transmitting, to the access network device, second data corresponding to the preset logical channel;
- the MAC CE comprises a sequence number of a data packet, and the MAC CE is for indicating the second terminal apparatus to stop transmitting, to the access network device, second data corresponding to the sequence number; or
- the MAC CE comprises an identifier of a data radio bearer, and the MAC CE is for indicating the second terminal apparatus to stop transmitting, to the access network device, second data corresponding to the data radio bearer.

11. The access network device according to claim 10, wherein the preset length is 0.

12. The access network device according to claim 8, wherein the obtaining a correspondence between a first terminal apparatus and a second terminal apparatus comprises:
- obtaining the correspondence between the first terminal apparatus and the second terminal apparatus from the first terminal apparatus, the second terminal apparatus, or a core network device.

13. The access network device according to claim 8, wherein the obtaining a correspondence between a first terminal apparatus and a second terminal apparatus comprises:

receiving first redundancy identification information from the first terminal apparatus;
receiving second redundancy identification information from the second terminal apparatus; and
determining the correspondence between the first terminal apparatus and the second terminal apparatus based on the first redundancy identification information and the second redundancy identification information.

14. The apparatus according to claim 8, wherein the operations further comprise:
receiving a redundancy sequence number (RSN) from the first terminal apparatus.

15. An apparatus, comprising:
at least one processor, and a memory storing instructions for execution by the at least one processor, wherein, when executed, the instructions cause the apparatus to perform operations comprising:
- obtaining a correspondence between the apparatus and a terminal apparatus, wherein the correspondence is sent by the apparatus to an access network device;
- receiving a first data packet from the access network device, wherein the first data packet comprises data sent by a master station device to at least one slave station device;
- sending the first data packet to the at least one slave station device; and
- receiving a second data packet, wherein the second data packet comprises data sent by the at least one slave station device to the master station device, and the second data packet is obtained by processing, by the at least one slave station device, a data packet that is the same as the first data packet.

16. The apparatus according to claim 15, wherein, when executed, the instructions cause the apparatus to perform operations comprising:
sending the second data packet to the access network device.

17. The apparatus according to claim 15, wherein, when executed, the instructions cause the apparatus to perform operations comprising:
sending the correspondence between the apparatus and the terminal apparatus to the access network device.

18. The apparatus according to claim 17, wherein, when executed, the instructions cause the apparatus to perform operations comprising:
sending a redundancy sequence number (RSN) to the access network device.

19. The apparatus according to claim 17, wherein, when executed, the instructions cause the apparatus to perform operations comprising:
sending a logical channel identifier to the access network device.

20. The apparatus according to claim 15, wherein, when executed, the instructions cause the apparatus to perform operations comprising:
sending redundancy identification information to the access network device, wherein the redundancy identification information comprises at least one of an identifier of the master station device, an identifier of the at least one slave station device, an identifier of a slave station device list, an identifier of the apparatus, and an identifier of the terminal apparatus, wherein there is the correspondence between the terminal apparatus and the apparatus.

* * * * *

UNITED STATES PATENT AND TRADEMARK OFFICE
CERTIFICATE OF CORRECTION

| | | |
|---|---|---|
| PATENT NO. | : 12,294,891 B2 | Page 1 of 1 |
| APPLICATION NO. | : 17/836719 | |
| DATED | : May 6, 2025 | |
| INVENTOR(S) | : Haifeng Yu and Feng Yu | |

It is certified that error appears in the above-identified patent and that said Letters Patent is hereby corrected as shown below:

In the Claims

In Column 53, In Line 31, In Claim 10, after "The" delete "apparatus".

In Column 54, In Line 9, In Claim 14, delete "apparatus" and insert -- access network device --.

Signed and Sealed this
Fourth Day of November, 2025

John A. Squires
*Director of the United States Patent and Trademark Office*